United States Patent
Haugli et al.

(10) Patent No.: US 7,142,521 B2
(45) Date of Patent: *Nov. 28, 2006

(54) WIRELESS PACKET DATA DISTRIBUTED COMMUNICATIONS SYSTEM

(75) Inventors: Hans-Christian Haugli, Rockcliffe Park (CA); William Robert Seed, Kanata (CA)

(73) Assignee: TransCore Link Logistics Corporation, Ontario (CA)

( * ) Notice: Subject to any disclaimer, the term of this patent is extended or adjusted under 35 U.S.C. 154(b) by 486 days.

This patent is subject to a terminal disclaimer.

(21) Appl. No.: 10/096,492

(22) Filed: Mar. 13, 2002

(65) Prior Publication Data

US 2002/0089956 A1    Jul. 11, 2002

Related U.S. Application Data

(63) Continuation of application No. 09/430,140, filed on Oct. 29, 1999, now abandoned, which is a continuation of application No. 08/760,208, filed on Dec. 4, 1996, now Pat. No. 5,991,279.

(60) Provisional application No. 60/008,320, filed on Dec. 7, 1995, provisional application No. 60/018,183, filed on May 23, 1996.

(51) Int. Cl.
*H04B 7/216* (2006.01)
(52) U.S. Cl. ............... 370/320; 370/324; 455/13.2; 455/13.4
(58) Field of Classification Search ......... 370/316, 370/319–321, 323, 342; 342/352, 354; 455/12.1, 455/427; 375/130, 132, 138
See application file for complete search history.

(56) References Cited

U.S. PATENT DOCUMENTS 4,532,635 A    7/1985 Mangulis (Continued)

FOREIGN PATENT DOCUMENTS

JP    61-206332    9/1986

(Continued)

OTHER PUBLICATIONS

Richard D. J. van Nee, Rogier N. van Wolfswinkel and Ramjee Prasad, "Slotted ALOHA and Code Division Multiple Access Techniques for Land-Mobile Satellite Personal Communications", Feb. 1995, pp. 382-388.

(Continued)

*Primary Examiner*—Duc Ho
*Assistant Examiner*—Phuongchau Ba Nguyen
(74) *Attorney, Agent, or Firm*—Blank Rome LLP

(57) ABSTRACT

A two-way satellite communications system includes an Earth station communicating with a plurality of remote terminals using a network access protocol that facilitates low power consumption by the terminals. The earth station generates forward link TDM packet data transmissions on one or-more satellite channels, and detects, despreads and decodes multiple concurrent return link slotted CDMA packet transmissions on one or more satellite channels. It communicates through a wired connection with a packet processing center which ultimately both delivers return link packet data to end-customers and receives forward link packet data from end-customers. The remote terminals receive, process and act upon forward link TDM transmissions on one or more satellite channels, and generate slotted spread spectrum CDMA transmissions on the return link on one or more satellite channels. The remote terminals communicate with a local digital data source and/or sink, digitize one or more local analog sensor signals, enter into a sleep mode to minimize the terminal's power consumption, and access the satellite communications network in accordance with the system network access protocol.

40 Claims, 12 Drawing Sheets

U.S. PATENT DOCUMENTS

| | | |
|---|---|---|
| RE32,905 E | 4/1989 | Baran |
| 4,901,307 A | 2/1990 | Gilhousen et al. |
| 4,905,221 A | 2/1990 | Ichiyoshi |
| 5,073,900 A | 12/1991 | Mallinckrodt |
| 5,084,900 A | 1/1992 | Taylor |
| 5,138,631 A | 8/1992 | Taylor |
| 5,220,320 A * | 6/1993 | Assal et al. ............... 340/2.21 |
| 5,379,320 A | 1/1995 | Fernandes et al. |
| 5,392,287 A | 2/1995 | Tiedemann, Jr. et al. |
| 5,410,568 A | 4/1995 | Schilling |
| 5,414,728 A | 5/1995 | Zehavi |
| 5,428,820 A | 6/1995 | Okada et al. |
| 5,490,087 A | 2/1996 | Redden et al. |
| 5,511,068 A | 4/1996 | Sato |
| 5,526,394 A | 6/1996 | Siczek |
| 5,566,168 A | 10/1996 | Dent |
| 5,588,005 A | 12/1996 | Ali et al. |
| 5,602,891 A | 2/1997 | Pearlman |
| 5,619,209 A * | 4/1997 | Horstein et al. ............ 342/352 |
| 5,638,399 A * | 6/1997 | Schuchman et al. ........ 370/320 |
| 5,991,279 A * | 11/1999 | Haugli et al. ............... 370/311 |
| 6,298,114 B1 | 10/2001 | Yoda |

FOREIGN PATENT DOCUMENTS

| | | |
|---|---|---|
| JP | 02-148924 | 6/1990 |
| JP | 04-309031 | 10/1992 |

OTHER PUBLICATIONS

Nikos B. Pronios, Performance Considerations for Slotted Spread-Spectrum Random-Access Networks with Directional Antennas, 1989, pp. 1613-1617.

* cited by examiner

WIRELESS PACKET DATA DISTRIBUTED COMMUNICATIONS SYSTEM

BACKGROUND OF THE INVENTION

This application is a continuation of our application Ser. No. 09/430,140 filed on Oct. 29, 1999 (now abandoned), which is a continuation of our application Ser. No. 08/760,208 filed on Dec. 4, 1996, now U.S. Pat. No. 5,991,279. which in turn claims priority under 35 USC 199(e) from our provisional application Ser. Nos. 60/008,320 filed on Dec. 7, 1995 and 60/018,183 filed on May 23, 1996.

The present invention relates to wireless communications, and more particularly, to a system for establishing two-way packet data communications, preferably by satellite, between a control station, the earth station in a satellite-based system, and a plurality of widely dispersed remote terminals. The system may be used to provide a communications conduit between a remote information source and/or sink and a fixed controlling and/or monitoring station.

Satellites at a geostationary orbit, located approximately 22,000 miles above the equator, may be used to provide one-way or two-way communications with a widely dispersed remote terminal population, some of which may be affixed to mobile assets. There are numerous existing satellite systems, providing a variety of voice and data services. Communication transmissions from the earth station of the present invention to the plurality of terminals is hereinafter referred to as the forward link, while communication transmissions from the terminal to the earth station is hereinafter referred to as the return link.

For many existing communication systems, such as cellular systems, individual terminals transmit and/or receive over their communications channel only sporadically, being active for typically less than 1% of the time. During periods of communication inactivity, many of these terminals still continue to operate at power consumption levels not markedly different from periods of active communications due to the need to exchange housekeeping data with a base station. When the capacity of the terminal's source of power is large relative to the terminal nominal power consumption, such as may be the case when the terminal is powered through an AC connection, inefficient use of power may be tolerable. For those cases where the source of terminal power is of limited capacity however, such as where batteries provide the power source, heightened efficiencies in power consumption are desirable to reduce the frequency of terminal communication outage periods and/or inconveniences associated with having to replace or recharge its batteries.

There are numerous examples of communication systems where terminals operating within a system network must be readily available for communications with its network controller. For such a system, a terminal may be required to continually monitor its receive channel and hence endure significant power consumption during periods of communications inactivity.

A method known by those skilled in the art for reducing the average power consumption at a remote terminal is to cycle the terminal between active and inactive states. The active state typically includes a receive mode in which the terminal monitors the forward link communications channel, a transmit mode in which the terminal transmits a return link signal via the return communications channel, and a terminal processing mode in which the terminal's processing engine, such as a microcontroller or microprocessor is active. The inactive state is often referred to as the sleep mode in which power is removed from one or more terminal components, and typically has a power consumption that is significantly less than for any of the active modes. The savings in power consumption, however, occur at the expense of terminal communications availability. For example, transmissions from an earth station will not be received and processed by the remote terminal if it is inactive during the transmission period. For such a case, the terminal is said to have a low availability. One solution to a terminal's reduced availability is to have the earth station transmit the same message numerous times to the terminal. In this case, the low power consumption achieved by the terminal using sleep mode occurs at the expense of bandwidth efficiency.

The primary purpose of a communications channel is to enable two or more entities to communicate, such as between a remote terminal and an end-customer. The forward and return link signals may include aids such as pilot signals to help terminals become synchronized with the earth station in both time and frequency, and a modest amount of communications overhead between a terminal and its network controller to facilitate network access by the terminal. The communications overhead between the network controller and terminals may include identification of a terminal or a periodic update of network parameters.

It is acknowledged by those in the art that it is desirable to minimize the communications overhead, and to thereby maximize the efficiency of the utilization of the communications channel. Mandatory periodic communications between each terminal and a base station, such as occurs in cellular systems, results in inefficient use of the communications channel, particularly for those applications where the nominal sleep period for communications between a terminal and end-user is significantly greater than the period of the mandatory communications.

U.S. Pat. No. 5,392,287 discloses a method of reducing the receiver power consumption for a communications system having a number of remote terminals. The system enables the receivers of each of the remote terminals to periodically enter an active state during which time they can receive messages addressed to it on a paging channel. The periodicity of the active state of the prior art is limited to be in the range from 2 to 128 seconds. There are a number of applications where communications between a remote terminal and the earth station is required on a much less frequent basis, such as on a monthly or daily basis. For such applications, the battery lifetime of the terminals using the concept of U.S. Pat. No. 5,392,287 would be unduly limited.

Furthermore, the transmitter of the earth station of the prior art, referred to therein as the base station, is required to transmit one or more messages to each terminal during each occurrence of its active state. This results and considerable power drain since the terminal must receive a block of data. Furthermore, while it may be desirable to have a terminal monitor the communications channel periodically to determine if there any messages or packets, it is not desirable in terms of the bandwidth efficiency to have the earth station transmit a message at each occurrence of a terminal's active state dedicated to that terminal. The communications overhead associated with the requirement to transmit a dedicated message to each terminal during its active state severely limits the capacity of the system.

Satellite communications is often used as the communications conduit between remote sensors, which may sense infrequently, and a monitoring station. For a number of those applications, it may be desirable to be able to remotely change the frequency with which the sensors are sensed without requiring physical access to the terminal or causing the remote terminal to become unavailable during periods of reconfiguration.

An object of the invention is to alleviate the aforementioned disadvantages of the prior art.

SUMMARY OF THE INVENTION

According to one aspect of the invention there is provided a wireless packet data communications system, comprising a control station, and a plurality of widely dispersed, remote terminals having an active mode during which they are capable of transmitting and receiving data packets and a sleep mode during which they are inactive, said control station and each of said remote terminals being capable of engaging in packet data communication over a TDM forward link from said control station to said terminals and a slotted multiple access return link from said terminals to said control station, each said remote terminal having a address and being assigned specific timeslots on the forward link during which it may be addressed by said control station, and each said terminal including a timer operable in said sleep mode to cause said terminal to periodically enter the active mode during its assigned timeslot, and a processor for interpreting packets received over the forward link, and said control station including a database for storing the timeslots assigned to the various remote terminals, means for transmitting on-demand, data packets addressed to specific terminals in their assigned timeslots on the forward link, and means for receiving data packets from the terminals in timeslots on the slotted return link.

Each terminal, even though it may have a group address so that several terminals can be addressed at once, will also normally have a unique address so that data can be sent to that specific terminal.

The system is typically a satellite-based system, in which case the control station may include an earth station for handling all communications with the satellite and a packet processing center. The latter, which may be geographically separate from the earth station, formats and processes the incoming and outgoing data in accordance with the desired protocol.

In the preferred embodiment, the frame structure for the slotted return link is the same as, and synchronized to, the forward link, offset within the terminal by a predetermined number of subframes. The frame structure is preferably a hierarchical frame structure in which the data packets in the forward link are carried in subframes, forming part of a hierarchy consisting of subframes, frames, multiframes, and superframes having respective lengths of 0.5 secs., 60 secs., 1 hour, and 24 hours. Each subframe, which is identified by its position in the hierarchy, carries time division multiplexed packets that include an address field for identifying the terminal for which the packet is destined. In the return link, the data packets occupy an entire subframe and are typically multiplexed within the subframe using Code Division multiplexing techniques, although other multiple access techniques could be used.

In such a hierarchical structure, the lowest order "frames" are referred to as "subframes". It is to be understood that the use of the term "timeslot" in the claims refers to any "frame", which includes, for example, a subframe in a hierarchical structure, that is capable of carrying a plurality of packets. In the forward link the packets are time division multiplexed into individual time slices within the timeslot, and in the return link they are code division multiplexed within a single timeslot or subframe.

The return link is preferably a system link employing CDMA (Code Division Multiple Access), but FDMA or frequency hopping MA could also be employed.

The slot boundaries of the return link should normally be synchronized to the forward link TDM structure as received at the terminal.

The use of TDM in the forward link provides sufficient capacity to carry the forward traffic, and for a multi-beam satellite permits the reduction of satellite costs by hopping the single TDM carrier among the satellite beams where customer terminals are located. It also provides a common time and frequency reference for all the remote terminals without the need to send a dedicated message to each terminal.

Each forward subframe includes synchronization/network packets and data packets. Synchronization/network packets enable the terminals to detect the presence of a forward link transmission, to synchronize the terminal's estimate of subframe timing and receive frequency with that of the forward link transmission, and to determine network status such as the current network version and terminal access conditions. Data packets follow the synchronization/network packet(s) and include terminal identification information and data for the identified terminal, such as a request for position location. The terminal identification information enables the terminals that are active to determine for whom the communications are intended. Each terminal has at least one identification code and may have multiple identification codes to facilitate data communications with a group of terminals.

The time slotted return transmission is compatible with the concept of waking up specific terminals to receive specific forward TDM subframes, and then transmitting any return signal in a specific return subframe to minimize terminal battery drain. Because the forward and return frames are synchronized, the Earth station knows when to expect a receive signal from a given terminal, and in which satellite uplink beam the signal will appear. This latter factor allows the Earth station receiver to beam hop in synchronism with, but slightly delayed from the beam hopping on the forward link. CDMA appears to provide the best compromise on equipment/software complexity and performance when there are more than the nominal 10 accesses.

The terminals preferably contain two oscillators, one timing terminal operations and the other for controlling the terminal's receive and transmit frequencies. Each time the terminal wakes up, receives and processes a subframe, it measures the difference between the calculated and actual arrival time of the subframe. Prom the time difference, it can correct its local time of day, which then allows the return signal to be accurately timed, and provides and accurate starting point for the subsequent sleep period. Alternatively, the terminal can use the time difference to calculate the error in the timing frequency and then modify a clock count-down to compensate for the frequency error. This latter approach improves the time accuracy of all subsequent terminal operations.

Each time the terminal wakes up and receives a subframe, it also notes the discrepancy between its receive local oscillator and the highly accurate downlink receive frequency. The local oscillator frequency discrepancy is used in two ways. In the short term, it provides an oscillator correction so that any subsequent terminal transmissions or receptions will be at a more precise frequency. In the long term, the discrepancy is averaged, and the resultant used to correct the local oscillator for long-term drift due to crystal aging.

Time and frequency resynchronization allows lower cost components to be used in the terminal oscillators and avoids the need for power-consuming crystal ovens, while maintaining terminal performance within specifications.

In another broad aspect the present invention provides a wireless packet data communications system, comprising a control station and a plurality of widely dispersed, remote terminals, means for establishing a forward TDM link from said control station to said terminals, and means for establishing a slotted multiple access spread spectrum return link from said terminals to said control station to permit selective packet data communication between said control station and any of said terminals. The slotted return link is preferably synchronized to the forward link at the terminals and offset by a predetermined number of timeslots.

The low power consumption permitted by the invention means that the terminals, which may be in remote or inaccessible locations, may have periods between battery replacement of years. There are four major states for the terminal in terms of power consumption from the internal battery: transmit, receive, measurement and sleep. In the transmit state the terminal will consume its greatest level of power, in the range of several watts. When receiving or making a measurement (such as a GPS location fix) the consumption will be less than when transmitting, but still be significant. When the terminal is "asleep", power consumption will fall to the microwatt level, primarily to maintain an internal clock.

The extended battery life is made possible by minimizing the length of any transmit, receive and measurement periods, minimizing the overall awake duty cycle, and hence maximizing the sleep time of the terminal. A key element in minimizing power is to preprogram into the terminal's memory specific times when messages might be sent to it on the forward link. These times can be changed through downloaded messages from the network controller. The terminal wakes up shortly before its preprogrammed forward "subframe" is to arrive. It receives and processes the short subframe, updates its internal clock and local oscillator, looks for any messages containing its address, and decides whether any action is required. If not, the terminal returns to sleep until the next wake-up time. If action is required, e.g. make a measurement and transmit the results, it is performed in a short interval, and the terminal returns to sleep. Any return transmissions occur in specific, short time slots.

The very long terminal battery lifetime can be achieved in accordance with the invention by having the terminal wake only at preprogrammed short periods to receive forward messages, make measurements, or transmit return messages. This concept is particularly effective when coupled with that of a beam-hopped forward TDM link and a beam-hopped slotted return link.

Space segment costs are formula-based on the utilization of satellite resources. The most scarce resources on an L-band mobile satellite, and hence the major factors in costing, are the L-band up and downlink bandwidth and the L-band downlink EIRP. The system in accordance with the invention can operate in several mobile satellite L-band beams. Mobile satellite service providers charge for average downlink L-band EIRP. The system hops a single carrier in TDM among the satellite beams. Additionally, the forward carrier is only activated when there are packets to be transmitted. Thus the EIRP costs for the system, particularly when first deployed, are significantly smaller than the normal cost for one forward channel. Additionally, the data-activated signal will resemble the voice-activated signal with which mobile satellite service providers are familiar and comfortable.

For forward transmission, a single, narrow band carrier is generated containing all messages in Time Division Multiplexed format. This single carrier may be switched among the satellite beams by simply altering its carrier uplink frequency, and hence beam, to allow all remote terminals to be serviced using the forward downlink EIRP of only one channel.

Normally for a periodic data transmission system, not all time slots of the TDM baseband signal are occupied. The forward carrier for the Data packets, and hence the downlink EIRP, may be muted when there is no data to be sent.

The above two actions are possible because the system has been designed with such an efficient terminal control scheme that many hundreds of thousands of terminals can be controlled with a single forward data stream of less than 1200 bits/sec average, which easily fits within a single satellite voice channel of 5 kHz.

An additional feature of the invention, which is a result of the forward beam hopping, is that in the return direction a single receive channel may also be effectively hopped among the return beams. In this case, a single channel unit in the Earth Station is controlled via its operating frequency to receive from only one of the satellite beams at any given time. The beam which is processed follows the beam to which the forward signal was transmitted, but with a delay of about 2 seconds. The use of a beam-hopping receiver only provides an efficient communications conduit if the terminal's return link transmissions are time-synchronized to the forward link transmissions and arrive at the Earth station at the correct time. This return beam hopping has no effect on satellite rental costs, but allows the return link to be received and processed with a single set of equipment at the Earth Station, rather than one for each satellite beam.

The system is designed to service many hundreds of thousands of terminals with an average system data rate of only a few kbps. What makes this possible is the very low communication duty cycle of the terminals and a very efficient means of controlling the terminal states of receive, measurement, transmit and sleep. Programmed into the terminal memory are time-tagged instructions for terminal operations. Terminals can follow their programmed steps with minimal information required from the network controller.

As noted above, the forward link to terminals of the system is a single, TDM signal divided into frames and subframes. Each terminal is programmed to look only at specific subframes among the tens of thousands which occur each day; hence only a small subset of all terminals would be looking at any given subframe. Each terminal has a unique address and possibly one or more group addresses. A terminal looks in its assigned subframes and processes only messages addressed to it. It is important to note that although many terminals may wake to receive and process a given subframe, only a few will have data packets addressed to them at that time. By means of allocating a subset of all terminals to a subframe, and addressing specific terminals within that subset, the network controller can provide over a single channel sufficient information to control these many hundred thousands of terminals. The geographic distribution of terminals among satellite beams is not a problem by virtue of the forward link beam hopping, which distributes the subframes as required among the beams.

The return communications from these terminals is multiplexed to minimize congestion. Terminals are assigned through a stored command or a forward message specific return subframes for transmission. Only a fraction of terminals assigned to a subframe are likely to actually use that assignment. Those that do will share the return channel in CDMA with each message being tagged with the terminal address.

Because communications with a terminal is not mandatory for each of its assigned forward subframes, the system can have a limitless number of terminals sharing the same subframe. These features, along with forward and return beam hopping, permit a large number of remote terminals distributed across a continent to be controlled with a very low rate communication link.

Traffic management is the means by which the system can allocate capacity in an efficient manner to maintain communications with several hundred thousands of terminals using a forward and return channel of only a few kbps data rate. The Network Operations Center (NOC) has three major modes in its traffic management responsibilities: normal data flow, traffic overload, and system failure recovery. Customers will specify the period between terminal wakeups and the nominal return link access method (e.g. poll, periodic, event driven). The NOC controls the actual time when a terminal wakes up, by which means it can uniformly spread wakeups across the day. The NOC controls the delay between the time of reception of a command by a terminal and when it transmits its response. Again this will reduce potential congestion by randomizing the time within a Subframe and/or the actual subframe used by a terminal. This is particularly effective following a poll message to a large group of terminals where the return link packets will then be distributed over a sufficiently long period to ensure a high probability of message success.

When congestion occurs in the forward direction, the NOC has a number of means of control to minimize the problem. If the congestion is very short term, with only a single Subframe overloaded, the NOC can spread the messages over two Subframes and set a forward overload flag. This flag tells terminals that messages for them may be in the first Subframe received after they wake up, or in the next available Subframe. For longer-term congestion involving messages to a specific beam, the NOC has the option of increasing the number of Subframes and hence the capacity to a beam, by changing the network version number. Other alternatives open to the NOC are to impose traffic priority, accepting only messages with higher priority for forward transmission, or assigning some terminals to another Subframe in the same beam which has a lower level of traffic.

Congestion in the return direction can be controlled directly by imposing return priority or by allocating more return Subframes through a change in network version. Indirect control can be accomplished by reducing the number of terminals being polled at any given time.

The congestion control techniques will also be employed to effect a gradual buildup of traffic after recovery from a system failure. In addition, terminals may be muted temporarily, with the NOC imposing a slow release from the muting by distributing traffic by priority and/or time delay.

An important aspect of a preferred embodiment of the invention is the combination of traffic management techniques that minimize the likelihood of information loss due to overload of the narrow communication channels by the messages to and from a very large number of remote terminals. The techniques include:

For the forward link:
control over terminal wakeup times
control over distribution of forward capacity among the satellite beams
efficient (in terms of terminal power consumption) method of extending the effective duration of a terminal's awake subframe to handle an occasional subframe overload
use of priority for extended forward channel overload For the return link:
return link access control to enable/disable terminal transmissions
use of return link message priority
time dispersal of terminal transmissions
control over distribution of return capacity among the satellite beams Because the system has a very low bandwidth for its forward and return channels, it is essential to minimize the non-revenue generating message traffic which has to be carried. When a terminal wakes up, listens for a prescheduled subframe, but does not receive that subframe, it enters a "loss-of-contact" mode, which tests the possible reasons for loss of contact, starting with the most likely, which is blockage of the propagation path. The terminal may also test whether, while it was asleep, the terminal had moved between satellite beams. In memory, it stores a subframe and wakeup schedule for each of the satellite beams in which it might find itself. The terminal tests whether it receives subframes at frame locations reserved for other satellite beams. If so, it recognizes which beam it is in, calls the stored wakeup schedule for that beam, and sends a short message to the PPC/NOC (Packet Processing Center/Network Operations Center) registering in that beam. This message is acknowledged by the PPC. No further overhead message is necessary as both the terminal and PPC/NOC have all the information they require.

It is an important feature that the terminal, on waking up, can recognize by itself that it had crossed a beam boundary and can recommence full operations in the new beam after a single registration message to the PPC/NOC. Conventional systems, such as cellular roaming terminals, require new timeslot assignments to be transferred to the terminal after it has crossed a cell boundary and notified the cell controller, which involves significant non-revenue generating overhead.

The remote terminals preferably use an L-band microstrip patch antenna to obtain near omnidirectional coverage, low profile, robustness and low cost. At present separate antennas are used for transmit and receive, although the concept of a single antenna for both transmit and receive will be evaluated as a future product enhancement. The terminal is operated in half-duplex. The present antenna receive bandwidth is sufficient for both the 1525 to 1559 MHz receive bandwidth assigned for satellite mobile operations, and also 1575.42 MHz which is used for the Global Positioning System satellite downlink.

The use of a single antenna element and Low Noise Amplifier to receive not only the terminal downlink signal from its communications satellite, but also the GPS satellite downlink signal which the terminal uses for position location significantly reduces package size and cost.

The invention is particularly applicable to the communication from a single location with a large number of geographically widely dispersed terminals without prior knowledge as to the approximate location of the terminals within the coverage area. The invention could be applied to broad coverage terrestrial systems.

There are many applications where a small terminal size and low terminal weight are desirable to minimize the terminal obtrusiveness. For example, it is often preferable to have small, inconspicuous terminals for use in security applications. The network access protocol or system of the present invention can facilitate long battery lifetime and result in fewer required batteries and hence a smaller terminal size, as the batteries of a battery-operated terminal can represent a significant fraction of the terminal volume and weight.

Because the return link of the present invention is characterized by a many-to-one link with the many being widely dispersed in a geographical sense, thereby resulting in differences in return link propagation delays, efficient utilization of the satellite channel is more difficult. CDMA (Code Division Multiple Access) spread spectrum techniques enable the simultaneous transmission by a plurality of terminals occupying the same spectrum. In the present invention, as noted above, each return link is preferably a CDMA transmission consisting of an encoded data signal modulated by a binary pseudo-noise (PN) waveform. As is known by those skilled in the art, the PN waveform comprises of multiple binary elements, hereinafter referred to as chips, with each chip of a duration that is much less than for an encoded data bit. The effect of modulation of the encoded data by a PN code word is an increase in the bandwidth of the data signal and a reduction in its power spectral density.

The PN codes for CDMA systems in general are designed to have noise-like characteristic, meaning that they have good auto-correlation and cross-correlation properties. As long as each of the terminal transmission received at the earth station differ in their timing by one or more chips, each transmission may be successfully decoded. The code length, which is the number of chips in the PN code before it repeats, is often selected to be equal in length to an encoded data symbol, but may range from less than an encoded symbol to multiple encoded symbols. For a PN code length of N chips there may be as many as N concurrent transmissions using that code which do not interfere with each other. If the system also includes M different codes, there may be as many as M times N concurrent, non-interfering transmissions.

Although the currently preferred embodiment does not employ a separate antenna, there are some applications in which it is desirable to displace the terminal antenna from its main electronics unit. In those applications, the antenna unit would typically include one or more antennas for receiving and transmitting RF signals, a high power amplifier for transmission, a low noise amplifier for reception and circuitry to control the transmit and receive amplifiers. A connection must then be provided between the antenna unit and the main electronics units to pass the transmit and receive signals and DC signals. It is desirable from a cost, installation and maintenance perspective to minimize the number of cables connecting the different units. The present invention would preferably use a single coaxial cable to pass RF and DC signals from the main electronics unit to the antenna unit, and control circuitry on both units to activate either transmit, receive, or sleep modes.

The terminals may be attached to a variety of platforms such as vehicles, aircraft and rail cars as well as fixed assets. The data communications path typically extends beyond both the terminal and earth station. For example, the terminal may be connected to a sensor which provides the source of data for a terminal transmission, while the earth station may act as a gateway to route the receiver sensor data packets to end customers.

The packet processing center maintains a database of the terminal active periods and can therefore ensure that forward communications with the terminals are provided in the appropriate subframes. Furthermore, the packet processing center can change the subframes during which the terminals may communicate. A change in the terminal active/inactive duty cycle can be requested by an end-customer to that packet processing center which can then allocate that terminal's active mode subframes. The frame and superframe structures enable the terminal to operate with a very low active duty cycle.

The forward link data is packetized, encoded using forward error correction coding techniques, modulated using binary phase-shift keying (BPSK) techniques, upconverted by an agile carrier frequency and transmitted. For the present invention the carrier frequency may be changed on a subframe basis and thereby enables utilization of multiple satellite channels or satellite spot-beams. In addition, the system of the present invention provides the capability for the earth station to mute forward link transmissions on a packet basis.

The forward link signal of the present invention is relayed by a geostationary satellite to the remote terminals. The received transmission is downconverted, demodulated, processed and acted upon by the terminal For the present invention, the return link preferably uses slotted spread spectrum CDMA techniques, in which the terminal CDMA transmissions begin and end within a single timeslot. The return link uses a subframe which is equal in length to, and synchronized with, the forward link subframe. Return link data is packetized, encoded using forward error correction techniques, interleaved to reduce the effect of burst errors, separated into two equal-length data sequences, each of which are encoded by different PN codes, modulated using quadrature phase-shift-keying (QPSK) techniques, upconverted by a carrier frequency and transmitted.

For the present invention, the return link spread spectrum CDMA signal, which may be transmitted concurrently by a plurality of terminals, is relayed by a geostationary satellite to the Earth Station and subsequently downconverted to baseband and digitized. The digitized signal is supplied to a digital signal processor for detection of user transmissions, for time and frequency synchronization of detected user transmissions, for demodulation of the spread spectrum signal into separate in-phase and quadrature phase signals, for despreading and de-interleaving of the in-phase and quadrature-phase signals, and for decoding of the despread in-phase and quadrature-phase signals. Return link transmissions decoded by the earth station are sent to a packet processing center for routing and subsequent distribution to end-customers. A return link packet from the packet processing center includes the sending terminal's identification, the end-customer address, data, and time and satellite beam of transmission.

Remote terminals of the present invention have means to communicate using the above wireless techniques with the earth station in a half-duplex mode, to communicate with an externally connected digital communications source via a serial communications port, to digitize an analog sensor input, to accept or provide digital I/O to make location measurements such as latitude, longitude, speed, and to utilize a sleep mode to preserve battery power.

The earth station of the present invention has means to communicate over one or more satellite channels or satellites, or multiple satellites with multiple beams using wireless techniques as described above with a plurality of mobile terminals and to communicate using a wired connection with a packet processing center.

BRIEF DESCRIPTION OF THE DRAWINGS

The invention will now be described in more detail, by way of example, only with reference to the accompanying drawings, in which.

DESCRIPTION OF THE PREFERRED EMBODIEMENTS

Figure 1:
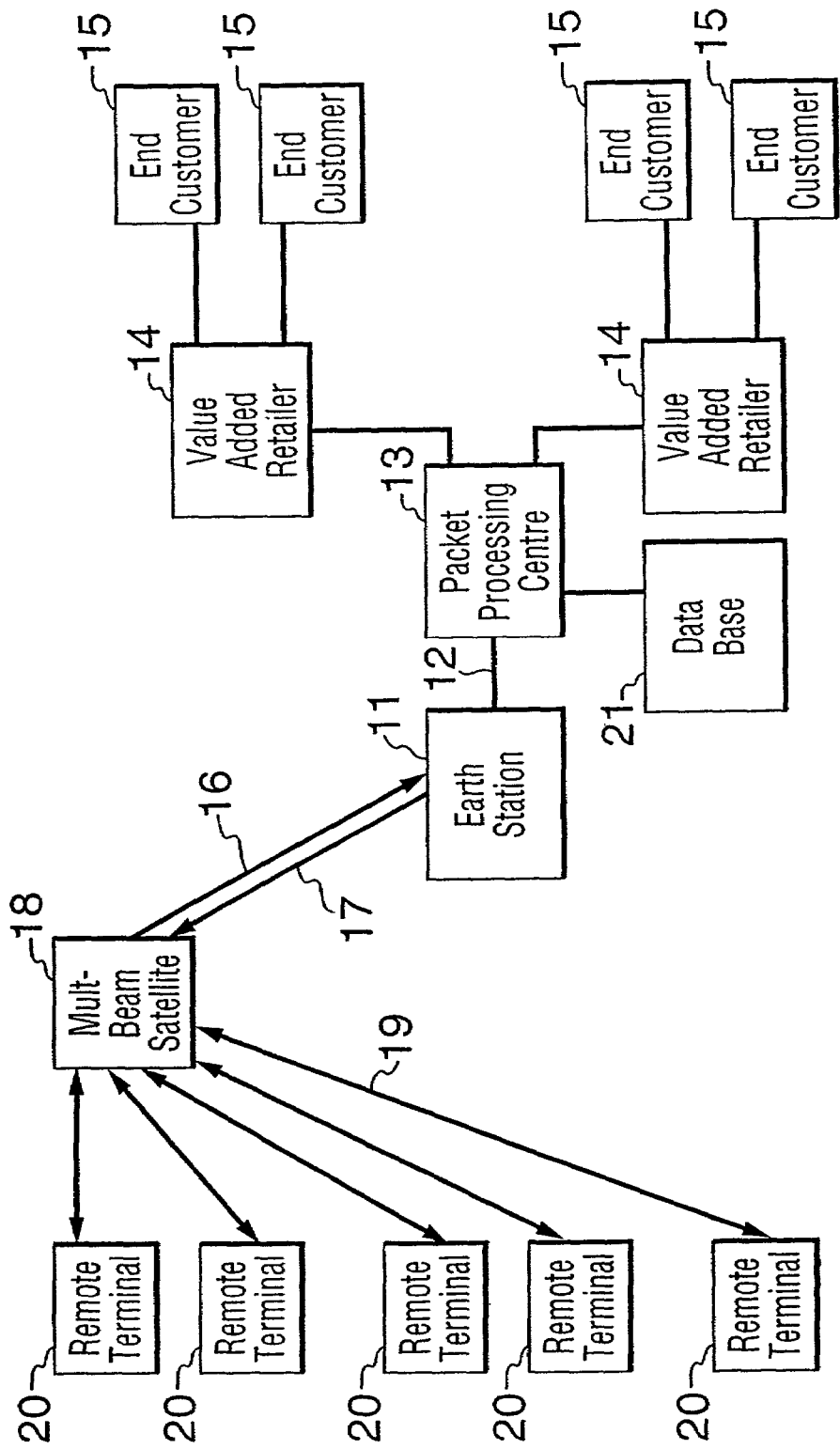
FIG. 1 is an overview of a satellite communications system in accordance with the invention.

Referring now to FIG. 1, the satellite communications system consists of a central Earth station 11 which is connected over a wired connection 12, for example, through a public switched network, to a packet processing center 13, normally operated by a service provider, which in turn is connected over a wired connection path to a value added retailer 14 and ultimately to one or more end customers 15. The packet processing center 13 includes a database 21 that stores information pertaining to the subframes allocated to particular terminals in a manner to be described in more detail below. The PPC 13 also stores beam information when multiple beam satellites are employed.

The Earth station 11 is also coupled by satellite links 16, 17 to a geostationary multi-beam satellite 18 which relays the signals via links 19 to and from a plurality of remote terminals 20, typically mounted on vehicles, such as helicopters, truck trailers, passenger cars, and rail cars. The satellite 18 permits coverage over a wide geographical area, such as the whole of North America, for example. The satellite 18 may broadcast to the entire coverage area although beam directing techniques allow this to be subdivided if desired. It will be understood that the links 19 shown in FIG. 1 represent point-to-point communications by virtue of the network access protocol to be described. The associated signals are broadcast over a wide geographic area.

The satellite communications link 17, 19 which originates at the earth station 11 and is relayed through a satellite 18 to the terminals 20, is referred to as the forward link. The satellite communications link 19, 16 which originates at the terminals 20 and is relayed through a satellite 18 to the earth station 11, is referred to as the return link. Those skilled in the art will acknowledge that the key elements of the present invention pertain to mobile as well as fixed terminals, to satellites in non-geostationary orbits and to terrestrial communication systems.

The manner in which the forward link transmission of the present invention is received and processed by the remote terminal is described with reference to FIG. 2. A portion of the transmission energy relayed by the geostationary satellite is captured by an antenna 40 of the Antenna Unit 47, and applied to a bandpass filter 41 which rejects signals outside the desired frequency band. Transmissions passed by the bandpass filter 41 are applied to an amplifier 42, which is enabled by a Tx/Rx sense module 46, and connected via coaxial cable 48 with a bandpass filter 52 of the Main Electronics Unit 50. The output signal of the bandpass filter 52 is supplied to a mixer 53 for downconversion to a convenient intermediate frequency (IF) by a frequency synthesizer 55 which is phase-locked to a local oscillator 64 and whose frequency is determined by a frequency controller 65.

The frequency controller 65 function is provided by a microprocessor 57. The output from the mixer 53 is applied to an IF bandpass filter 54 to further reduce the noise and electromagnetic interference near the frequency band of interest. The output from the bandpass filter 54 is applied to a quadrature detector 56 for downconversion to baseband by another output of the frequency synthesizer 55.

The in-phase (I) 58 and quadrature-phase (Q) 59 outputs of the quadrature detector 68 are supplied to analog-to-digital converters (ADC) 60. The digitized signals from the ADC 60 are converted to binary encoded symbols by a demodulator 61 and then decoded to binary data by a decoder 62 The ADC 60 demodulator 61 and decoder 62 functions are provided by a microprocessor 57. The output of the decoder 62 is written to an output buffer 77 which may subsequently provide the digital signals to external data sinks, such as computers and relays.

The timer logic 79 of in the microprocessor 57 enables the terminal to operate in a sleep mode and to wake up periodically to determine if it is to enter the transmit mode, receive mode or process mode. DC power is kept to a minimum when the microprocessor 57 is in sleep mode. The timer logic unit 79 wakes up the terminal during pre-assigned timeslots as will be described in more detail below.

The Tx/Rx sense module 46 senses the DC signal provided on the coaxial cable 48 as provided by the Tx/Rx control module 51. The Tx/Rx sense module will turn on the transmit amplifier 45 or receive amplifier 42 or neither as determined by the sensed DC level on coaxial cable 48. The Tx/Rx control module 51 is in turn controlled by microprocessor 57 to be active or inactive according to its current network access structure, described in a later figure.

Figure 2:
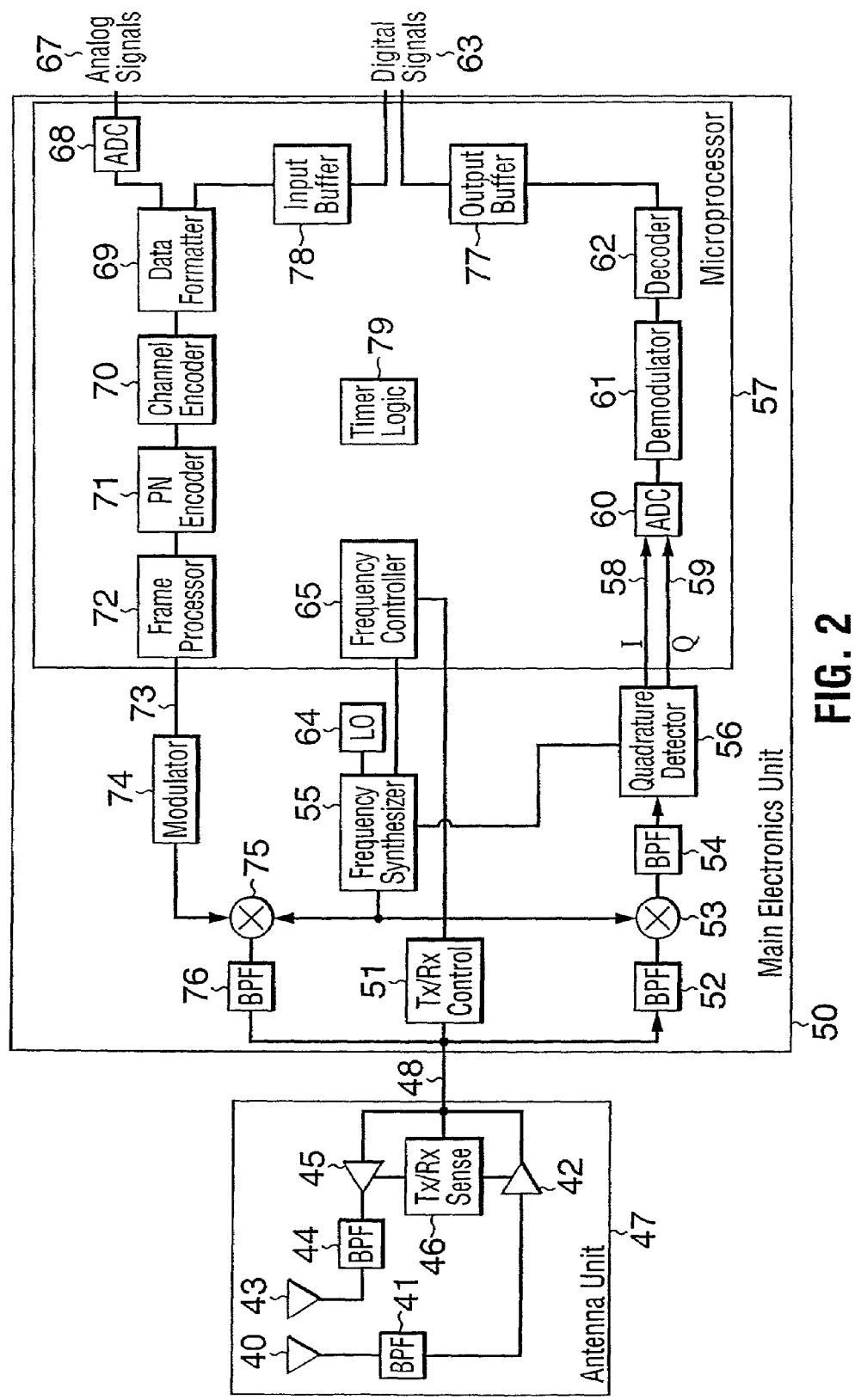
FIG. 2 is a functional block diagram of a remote terminal.

FIG. 2 also illustrates the return link spread spectrum CDMA transmission operated at the remote terminal. The source of the transmission may be analog 67, such as provided by an environmental sensor, is digitized by an ADC 68 provided on the microprocessor 57. Alternatively, the source of the transmission could be digital signal 63, such as from a computer, that would be written to an input buffer 78. The output of the input buffer 78 is subsequently applied to a data formatter 69, which packetizes the return link data signal and adds such information as the packet type, the destination and the packet originator. The output from the data formatter 69 is delivered to a channel encoder 70 which provides both robust forward error correction and interleaves the symbols of the return link packets. The channel encoder 70 output is then applied to a PN encoder 71 which may also be referred to as a CDMA spread spectrum encoder. The output from the PN encoder 71 is sent to a frame processor 72 that embeds the encoded, spread spectrum packet into the return link subframe structure.

The frame processor 72 supplies the binary PN encoded signal 73 to a modulator 74 which converts the signal to a QPSK waveform. A frequency synthesizer 55 is used to upconvert the baseband output of the modulator 74 at a mixer 75. The output of the mixer 75 is filtered using a bandpass filter 76 and connected via coaxial cable 48 with the antenna unit 47, where is it provided to a high power amplifier 45, in turn to a bandpass filter 44 and finally to an antenna 43 for transmission. The high power amplifier 45 is enabled by the Tx/Rx sense module 46 under the control of the Tx/Rx control unit 51.

Figure 3:
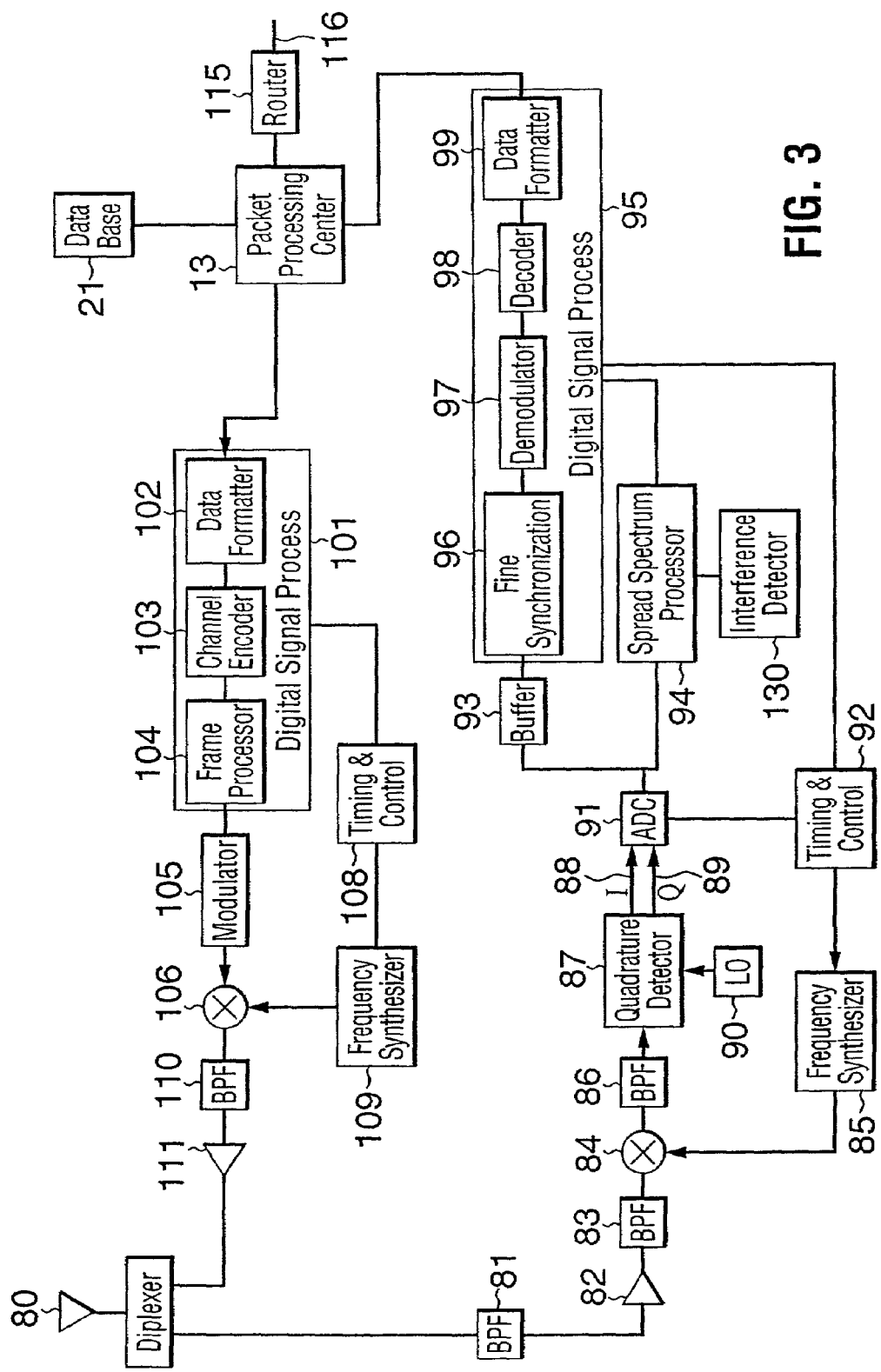
FIG. 3 is a functional block diagram of an Earth station.

Referring now to FIG. 3, the data to be sent to one or more remote terminals is delivered to the earth station using a wired correction 116 through a router 115 to a packet processing center 13. The packet processing center 13 then forwards the data packets to a data formatter 102. Each data packet delivered to the Earth station includes the address of the target mobile terminal or more group of terminals. Since the mobile terminal may have both an individual and one or group addresses, the forward link of the present invention supports concurrent communications with multiple mobile terminals.

The data formatter 102 places the data packets in subframes within a frame structure, which will be described in detail with reference to FIG. 4. The output of the data formatter 102 is passed to a channel encoder 103 for the application of forward error correction to help compensate for bit errors which may be caused by the satellite communications channel. The output of the channel encoder 103 is passed to a frame processor 104 which adds the encoded packets to a TDM forward link structure. The frame processor 104 mutes the forward link data packets when there is no data to be transmitted during all or part of a forward link subframe. The data formatter 102, channel decoder 103 and the processor 104 functions are provided within a digital signal processor 101.

The output from the frame processor 104 is connected to modulator 105 which converts the binary encoded data to a modulated BPSK waveform for subsequent upconversion at a mixer 106 by a carrier frequency signal supplied by a frequency synthesizer 109. The digital signal processor 101 and frequency synthesizer 109 are synchronized in time to the same subframe by a timing and control module 108. Timing control signals are provided by a timing and control unit 108 to transition the frequency synthesizer 109 at the correct time. The timing and control unit 108 also provides timing signals to the digital signal processor 101, to ensure that the encoded data signal from the frame processor 104 is time-aligned with the carrier frequency generated by the frequency synthesizer 109.

The output of the mixer 106 is applied to a bandpass filter 110 to minimize radio frequency (RF) emissions outside of the desired satellite communications spectrum. The output from the bandpass filter 110 is then delivered to an amplifier 111, which in turn provides the RF signal to a diplexer 112 and on to an antenna 80 for transmission to a geostationary satellite where it relayed to the remote terminal.

For the return link, an antenna 80 captures a portion of the return link signal and passes it to a diplexer 112 and then to a bandpass filter 81 which suppresses spectral energy outside of the desired return link frequency band. The output of the bandpass filter 81 is amplified using a low noise ampler (LNA) 82, and subsequently supplied to a mixer 84 for downconversion to a convenient intermediate frequency by a frequency synthesizer 85. The output of the mixer 84 is passed to a narrow bandpass filter 86 which further limits the spectral energy around the return link spread spectrum signal. The output of the bandpass filter 86 is provided to quadrature detector 87 for conversion to baseband by a local oscillator 90. In-phase 88 and quadrature phase 89 baseband signals are provided by the quadrature detector 87 for digital conversion by an ADC 91.

The digitized output from the ADC 91 is provided to a buffer 93 and a spread spectrum processor 94. A timing and control unit 92 provides the ADC 91 with a conversion trigger, the frequency synthesizer 85 with a frequency control word, and the digital spread spectrum processor 95 with timing signals. The buffer 93 stores over one subframe of samples of the spread spectrum signal for a digital signal processor 95. The spread spectrum processor 94 processes the digitized signal for the presence of CDMA transmissions from remote terminals of the present invention. The spread spectrum processor 94, which consists of multiple digital signal processors, provides concurrent processing of the digitized signal for all timing offset hypotheses and CDMA code possibilities.

The spread spectrum processor 94 detects the presence of remote terminal CDMA transmissions and provides an indication to the digital signal processor 95 of the detection of a CDMA transmission, the associated CDMA code and the approximate start of the transmission. An interference detector 130 is provided to process the digitized signal for the presence of interference from existing satellite channels for the purpose of our co-pending application Ser. No. 08/760,207. now U.S. Pat. No. 5,914,944, filed on even date herewith and entitled "METHOD OF IMPROVING THE EFFICIENCY OF RADIO CHANNEL USAGE IN OVERLAPPING COVERAGE AREAS", the contents of which are herein incorporated by reference.

The fine synchronization unit 96 then provides fine time and frequency estimates on the detected CDMA transmissions. The output from the fine synchronization unit 96 consists of despread QPSK signals which are then supplied to a demodulator 97 for conversion to a binary, encoded data signal, and in turn to a decoder 98 for de-interleaving and forward error correction decoding. The output from the decoder 98 is provided to a data formatter 99 for conversion to a suitable format for the packet processing center 13. The packet processing center 13 then sends the return link packets to a router which delivers the packets to end customers using wired 116 means.

Figure 4:
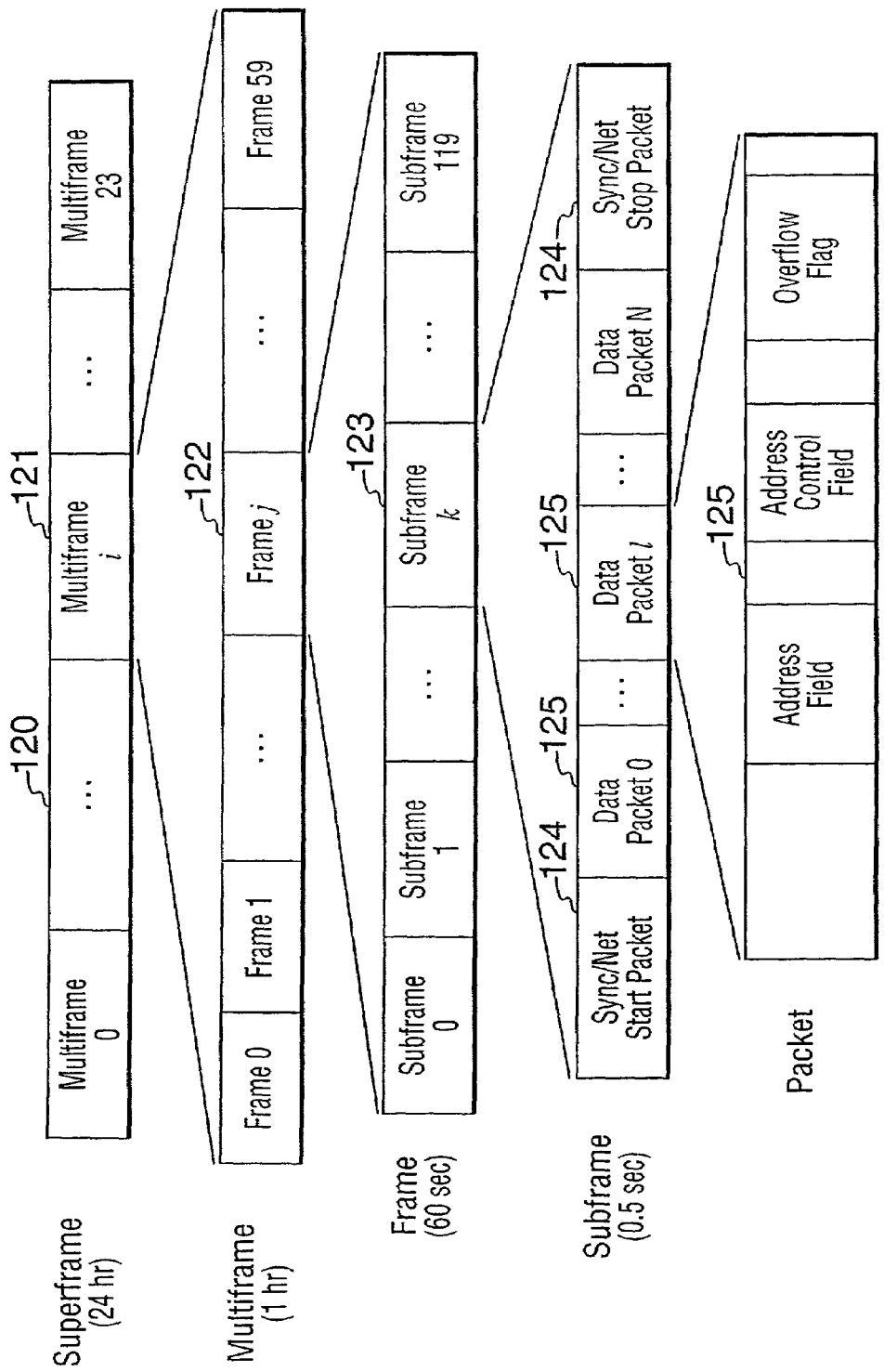
FIG. 4 is a diagram showing the forward link TDM structure.

The forward link TDM structure of the present invention is shown in FIG. 4 as a function of time. Forward link communications may be buffered up to superframes 120 having a repetition frequency of about one day. Each superframe 120 is comprised of I equal length multiframes 121 having a length of approximately one hour. Each multiframe 121 in turn consists of J equal length frames 122 having a length of approximately one minute. A frame 122 is comprised of K equal-length subframes 123 with a length of 0.5 secs., each of which is sub-divided into time slices carrying L time division multiplexed packets 124, 125 which are all equal in duration.

The first and last q packets 124 are referred as synchronization/network packets or simply as sync/network packet. The sync/network packets 124 provide the remote terminals with synchronization and network status aids. Up to L-q data packets 125 may be transmitted over the remainder of a subframe. When there are no data communications to be provided during a subframe or portions therein, the forward link signal will be muted. A number of data packets 125 are reserved on a frame basis for the provision of a network bulletin board, which includes such information as subframe to satellite channel mapping.

Each packet 125 may contain a number of separate fields such as an address field, an access control field, or an overflow flag, which is used to indicated that there is more data to follow in a subsequent subframe. The amount of data that can be sent in a subframe is limited to N data packets. Depending on the number of terminals it is desired to address and the amount of data to send, it may not be possible to send all the desired data in one subframe, after which the target terminals would normally return to the sleep mode. The overflow flag can be set to tell the terminal to stay awake because there is more data to follow for them in a subsequent subframe that would not normally be allocated to those terminals. Of course, if the overflow flag is set, the following packets take up slots in the next subframe that would normally be allocated to different terminals, so there is a trade-off between system capacity and accessibility.

A potentially limitless number of terminals may share a common active receive subframe. The number of terminals that may feasibly share a common active receive subframe is dependent on the amount of data to be carried and the frequency with which it is desired to send data to any particular terminal.

The L-q data packets 125 may be addressed to one or more of these terminals, or may be muted if there are no forward link packets to be transmitted. Each terminal, which has a unique address, that is active during a particular subframe processes all data packets 125 and subsequently determines the terminal(s) to whom the each packet is addressed. If a terminal does not detect its address among any of the L-q data packets 125, it enters the sleep mode and will remain inactive until its next active receive subframe or, if it is enabled for external interrupt, until interrupted by a local source. If a terminal does detect its address among the data packets 125, it further processes the respective packet(s) and responds accordingly.

The return link frame structure shown in FIG. 5(*a*) is similar to that of the forward link described with reference to FIG. 4. Return link data may be buffered over superframes 130 having a repetition frequency of one day. Each superframe 130 consists of I multiframes 131 having a repetition frequency of one hour, and each multiframe 131 consists of J frames 132 with a length of one minute and comprised of K subframes 133 with a length of 0.5 secs.

Unlike the forward link, the subframes 132 in the return link are not subdivided. Each subframe carries data packets spread over the entire subframe that are multiplexed using CDMA multiplexing techniques.

Figure 5A:
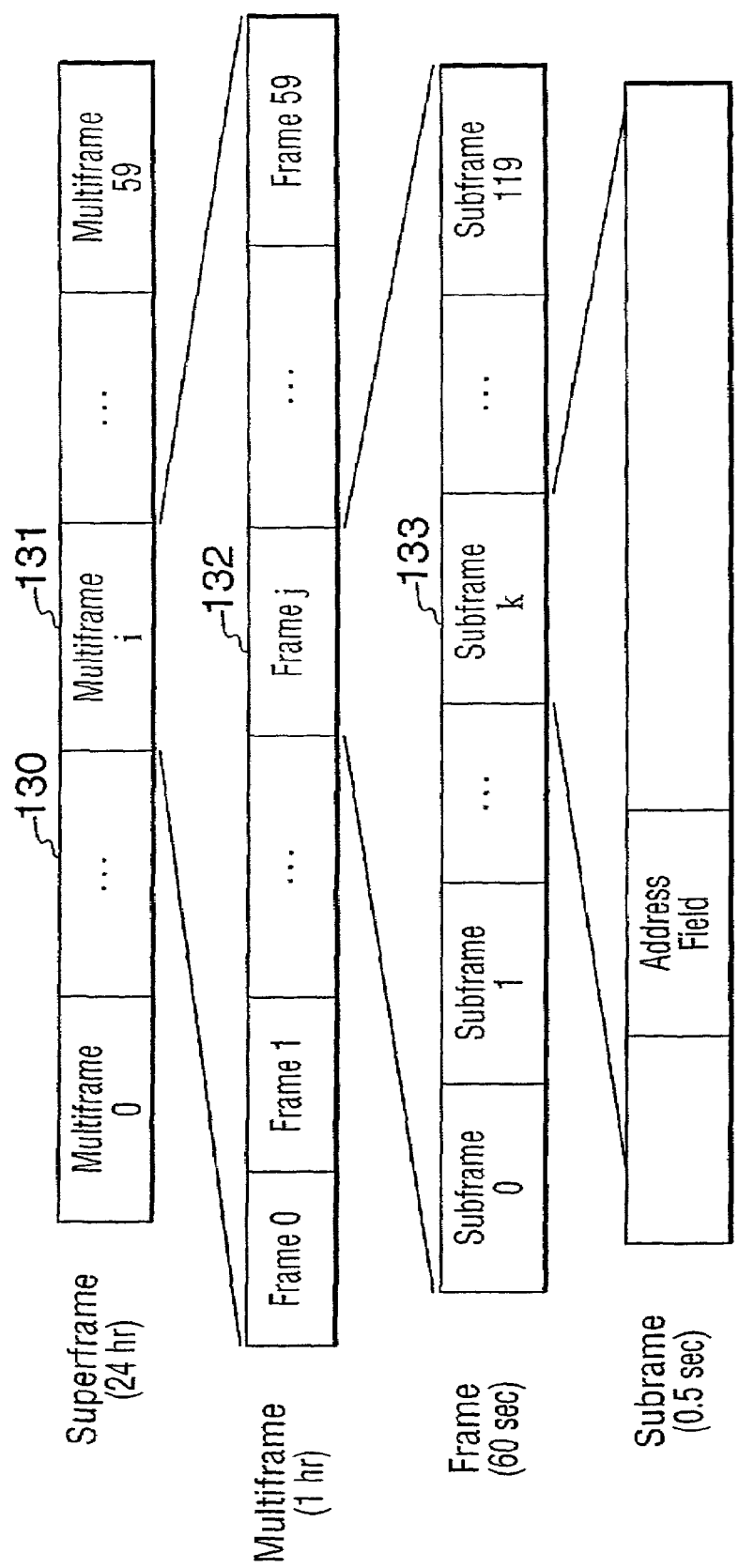
FIG. 5a is a diagram showing the return link slotted CDMA structure.

As shown in FIG. 5(*b*), the return link subframes 133 at the remote terminals are synchronized in time to the forward link subframes 123, being offset by a discrete number of subframes A. The forward link subframes 123 include up to L-q data packets which may be used to request a transmission from one or more remote terminals. For example, a request for a remote terminal transmission may be provided in particular forward link subframe. The forward link packet is then processed by the terminal(s), and results in a terminal transmission during a subsequent return link, offset in time by A subframes from the forward link subframe carrying the request.

Figure 6:
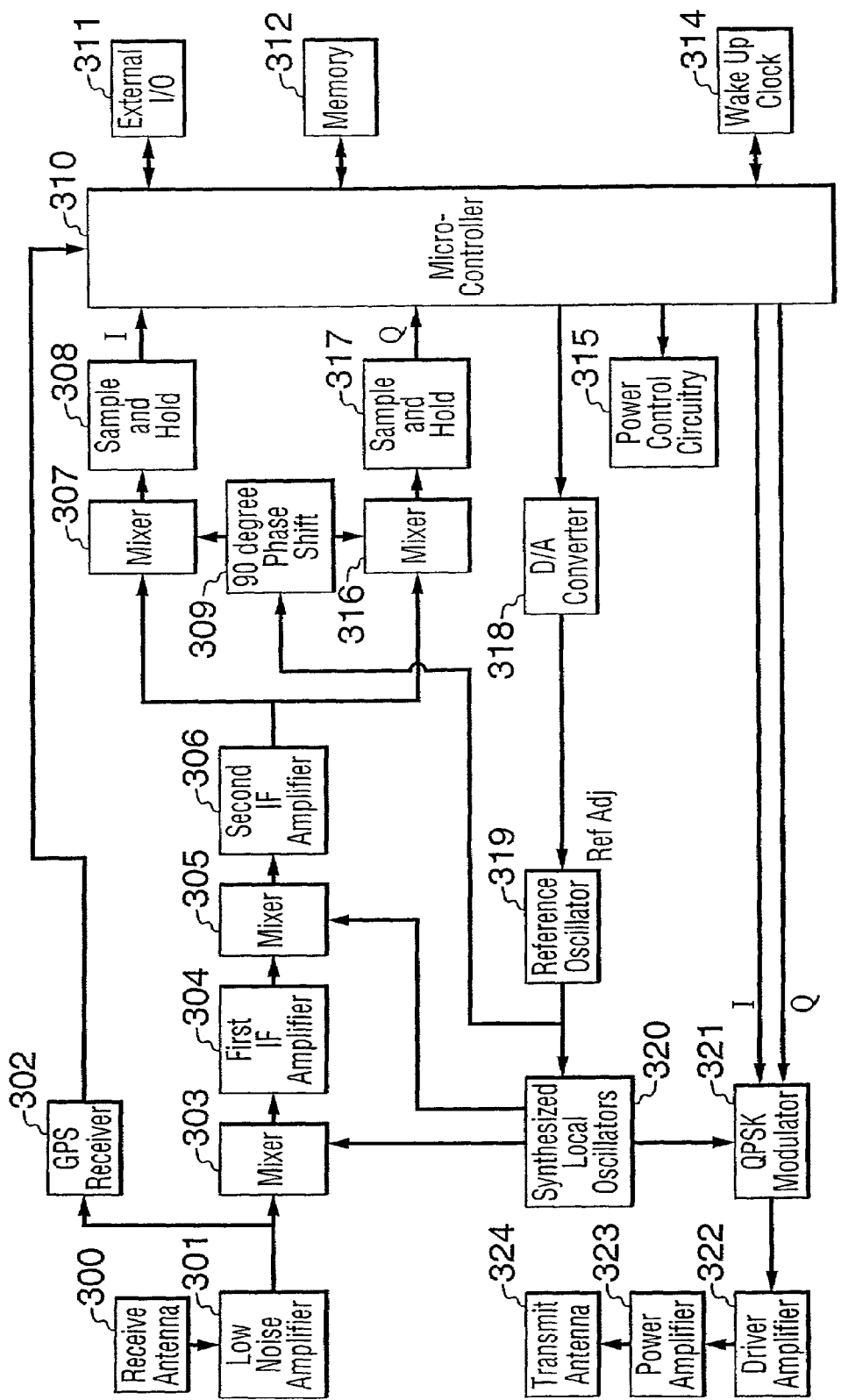
FIG. 6 is a block diagram of a second embodiment of a remote terminal.

FIG. 6 shows a second embodiment of the remote terminal. Signals from receive antenna 300 are passed through low noise amplifier 301 to mixer 303 and conventional GPS receiver 302 which sends the current position coordinates to microcontroller 310. Synthesized local oscillators 320, which are controlled by reference oscillator 319 whose frequency is adjusted by the microcontroller 310 via digital-to-analog converter 318 in a manner to be described, generate in mixer 303 an IF signal which is amplified in a first IF amplifier 304, mixed in mixer 305 to generate a second IF frequency, which is then amplified in second IF amplifier 306, from where it is passed through mixers 307, 316 an sample-and-hold circuits 308, 317 to microcontroller 310.

The output of reference oscillator 319 is connected through 90° phase shifter 309, whose outputs are connected to the second inputs of mixers 307, 316 to generate the in-phase I and quadrature Q components of the signal.

The microcontroller 310, for example a Phillips P80CL580 is connected to external I/O ports 311, memory 312 and wake-up clock 314, which periodically wakes up the terminal to receive incoming signals.

The microcontroller is connected to power control circuitry 315.

On the transmit side, the I and Q components of the signal are passed separately from the microcontroller 310 to QPSK modulator 321, which is driven by the synthesized local oscillators 320.

The output of the QPSK modulator is passed through driver 322 and power amplifier 323 to transmit antenna 324.

Figure 7:
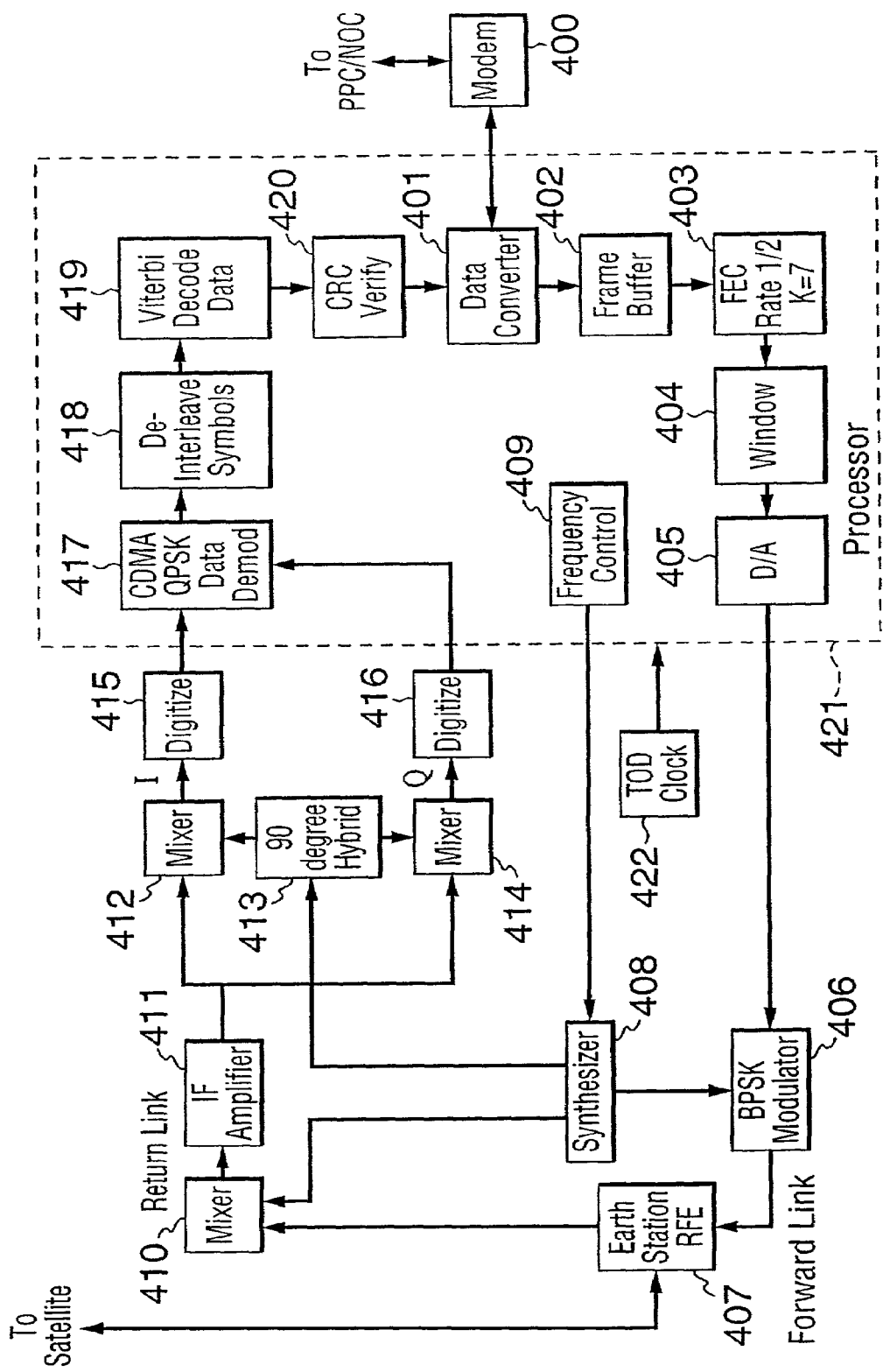
FIG. 7 is a block diagram of a second embodiment of an earth station.

The second embodiment of the earth station is shown in FIG. 7. Data from the PPC/NOC 13 is received via modem 400 and passed to data converter 401, which converts it into a format suitable for satellite transmission. From there it is passed through a buffer 402, and a FEC unit 403 for forward error correction, window unit 404, an digital-to-analog converter 405, and BPSK modulator 406. From there it is passed through the earth station RF equipment 407 to the satellite.

On the return path, the incoming CDMA signal is passed from the RF equipment 407 through mixer 410, IF amplifier 411 to mixers 412 and 414 for isolating the in-phase and quadrature components. These are digitized in units 415 and 416 and fed to CDMA/QPSK demodulator 417, symbol de-interleaver 418 and Viterbi decoder 419. After a CRC check 420, the signals are passed through data converter 410 and modem 400 back to the PPC/NOC 13.

Clock 422 is connected to processor 421, which performs the functions contained within the dotted box. Frequency control unit 409 within the processor controls synthesizer 408, which drives the IF mixer 410 and in-phase quadrature and mixers 412, 414 through 90° hybrid 413, and the BPSK modulator 406.

Figure 8:
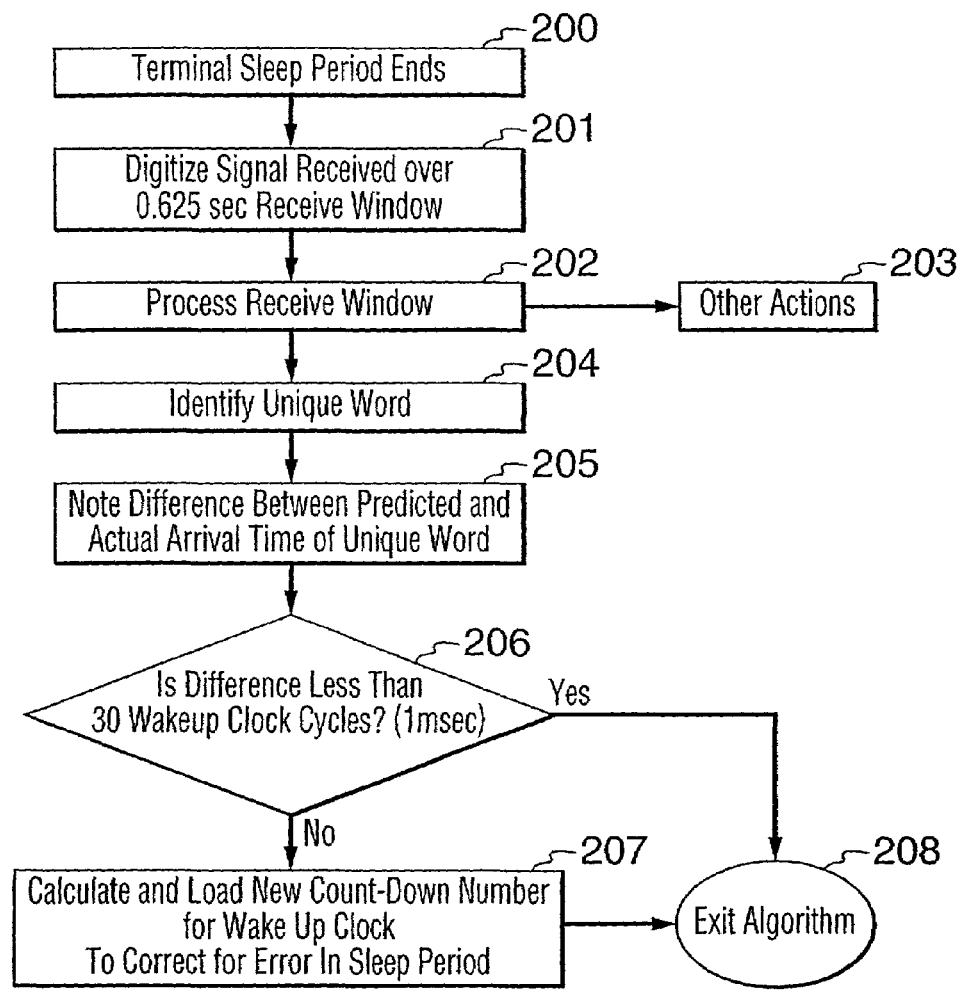
FIG. 8 illustrates the sleep clock synchronization algorithm for the remote terminal.

As indicated above, the timer logic or clock 79, 314 periodically wakes up the remote terminal to listen for incoming data. In order to minimize the cost of the terminals, it is desirable to use a low cost oscillator, which may be liable to drift. To correct this, the oscillator may wake up the terminal for a short time more frequently than the occurrence of its allocated subframe, for the purposes of resynchronizing the clock. For example, if a particular terminal is allocated only one subframe in the hierarchical frame structure, this will only repeat once every twenty-four hours, yet the clock may need to be reset more often than this. In one advantageous embodiment, the terminal may, for example, be woken up once every hour solely for synchronization purposes so as to ensure that when the next listening period comes round, the clock will be adequately synchronized to the earth station. FIG. 8 shows the algorithm for achieving this.

At step 200, for example, after one hour, the terminal sleep period ends and the timer 79, 314 typically a countdown timer, which draws minimal current in the sleep mode, wakes up the terminal just before the start of an anticipated incoming subframe on the forward link. The received signal is digitized over a 0.625 sec. receive window in step 201 so as to ensure that the window encompasses a complete 0.5 sec. subframe. The received window is processed at step 202 to identify a unique synchronization word carried by the subframe. At step 205, the difference between the actual and predicted time of arrival of the unique word is noted. Decision step 206 determines whether this difference is greater than a predetermined number of clock cycles, typically 30, and if so corrects the clock synchronization by loading a new number into the count-down timer's internal register.

The process exits at step 208 and the terminal goes back to sleep until the next wake-up period. After processing of the receive window, other actions, such as the synchronization of the local oscillator frequency can also be taken at step 203. This process will be described with reference to FIG. 7.

Typically, the wake-up clock 79, 314 will run at 32 KHz and be divided down to 8 Hz to generate a pulse every 125 msecs. In one embodiment, the active state can be divided into two substates, a fully active state where the receive circuitry is switched on and a partly active state where only the microcontroller is switched on. Every 125 msces, the clock can wake up only the microcontroller 310, placing the terminal in the partly active state. The microcontroller checks to see whether it is time to listen for an incoming subframe or whether a threshold has been exceed on one of its inputs. If not, it goes back to sleep. If it is, it switches on the receive circuitry to grab an incoming subframe, after which it switches off the receive circuitry, which next to the transmitter circuitry has the greatest power drain. It then digitizes the subframe, checks the clock synchronization and looks for data packets addressed to it.

In the fully active state, a distinction can be made between synchronization wakeups and data-receive wake-ups. For example, typically the system might wake up every six minutes to grab an incoming subframe and stay on long enough to extract the synchronization word so as to resynchronize the timer. Then, for example, every two hours, or possibly up to a month or more, the terminal may wake-up long enough to extract the data to see if there is a message addressed to that terminal. Substantially more power is required to extract all the data in the subframe than is required to extract the synchronization word alone. In this way the timer synchronization can be maintained while the terminal need only be placed into the full receive and processing mode when actually needed. This could be as infrequently as hours, days, weeks or even months.

Figure 9:
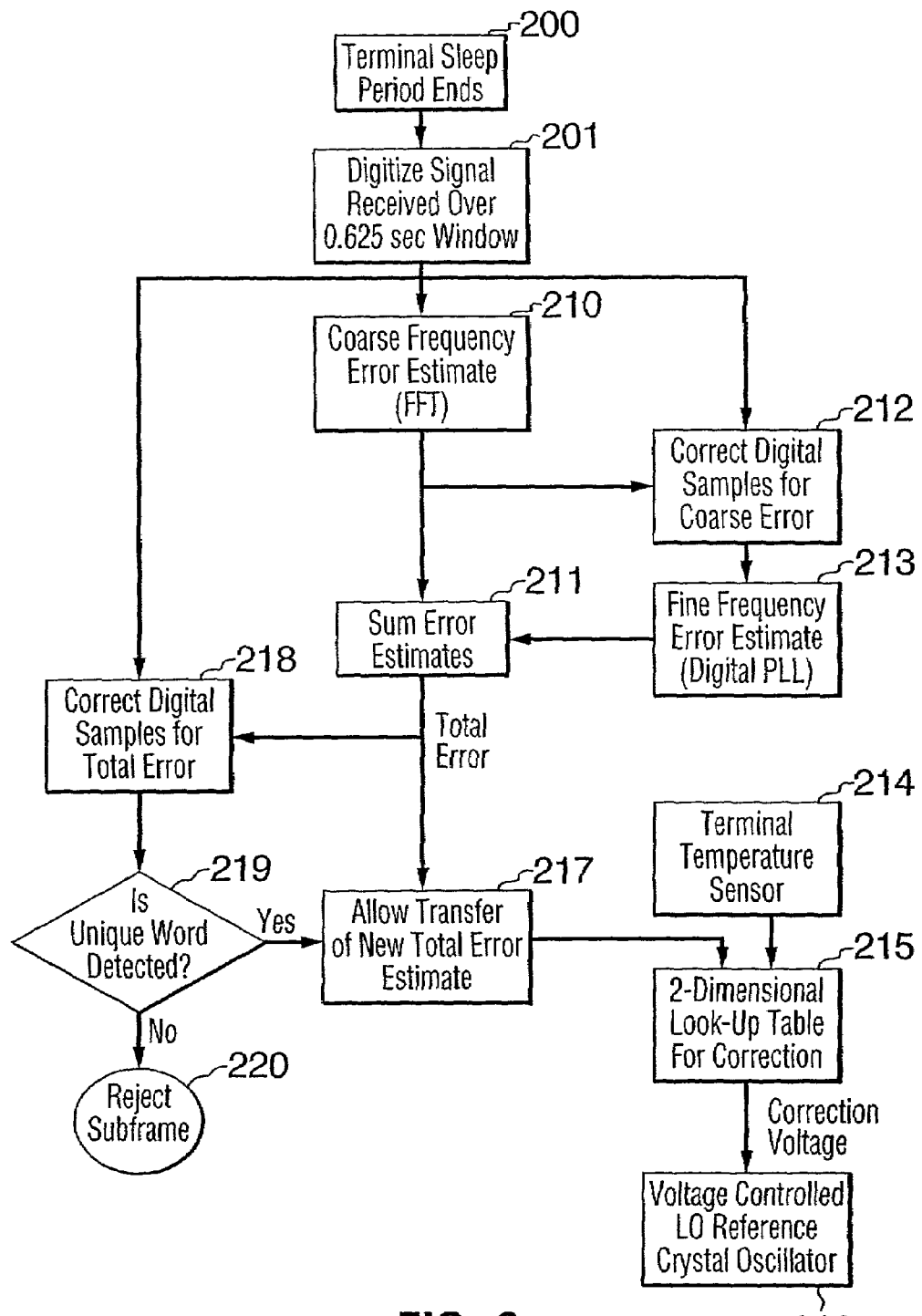
FIG. 9 shows the local oscillator synchronization algorithm for the remote terminal.

Referring now to FIG. 9, first a course frequency estimate is made with an FFT filter at step 210 and the digital samples corrected for coarse error at step 212. At step 213, a fine frequency estimate is made using a digital phase-locked loop. The sum of the error estimates is obtained at step 211 and the digital samples corrected for total error at step 218. Step 219 decides whether the unique synchronization word is detected, and if not the subframe is rejected. If the unique word is detected, the total error estimate is transferred to a two-dimensional look-up table 215 for voltage correction 216 of the voltage controlled reference oscillator 64, 319.

A temperature sensor 214 is connected to the look-up table so as to ensure that crystal oscillator 64, 319 is corrected for changes in temperature.

Figure 10:
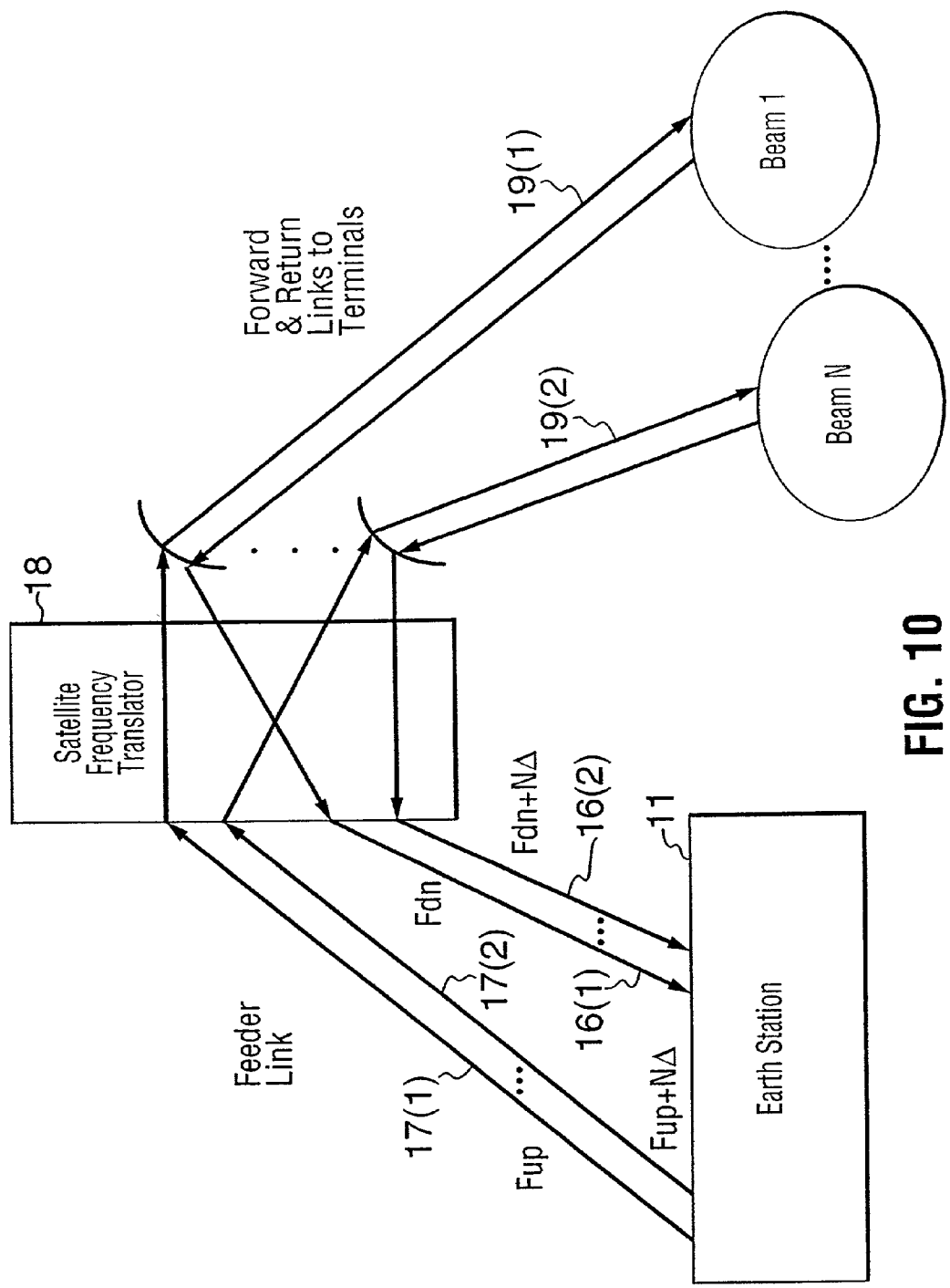
FIG. 10 is a diagram illustrating a beam hopping arrangement optionally employed in the communications system.

While it is possible to employ a satellite with wide area coverage, for example, continent wide coverage, beam hopping techniques may be used to increase the efficiency of satellite usage. As shown in FIG. 10, a plurality of uplinks and downlinks having frequencies $F_{up}$ ... $F_{up}+N\Delta$, $F_{dn}$ ... $F_{dn}+N\Delta$, are used to carry the data between the earth station and the satellite, which has a frequency translator to transfer data to any one of N spot beams $19^1$ ... $19^n$ with different, usually partially overlapping, areas of coverage.

The use of satellite spot beams allows an additional layer of sophistication to be added to the terminal addressing scheme. In addition to allocating a subframe to a particular terminal or terminals, which can be shared with other terminals, the system can also identify a terminal to a particular spot beam.

While a plurality of terminals may share a subframe without the use of beam-hopping techniques, the number of such terminals that may share a subframe is limited by the number of terminals that the system may wish to access independently, but at the same time, and the amount of data to be sent. For example, if there are N data packets in a given subframe, N individual terminals can be addressed independently in the subframe, assuming it is only desired to send one packet to each terminal. Of course, it some cases, it may be desired to address several terminals by a single group address in which case the same packet can be received by each terminal of the group. With the use of beam hopping techniques, and in an embodiment which uses multiple TDM forward carriers, a terminal can be allocated a particular beam in addition to subframe so that another terminal in a different beam, preferably a non-adjacent beam, can occupy exactly the same timeslot within a subframe without interference. The beam identifier for each terminal is stored in a database at the earth station.

Figure 11:
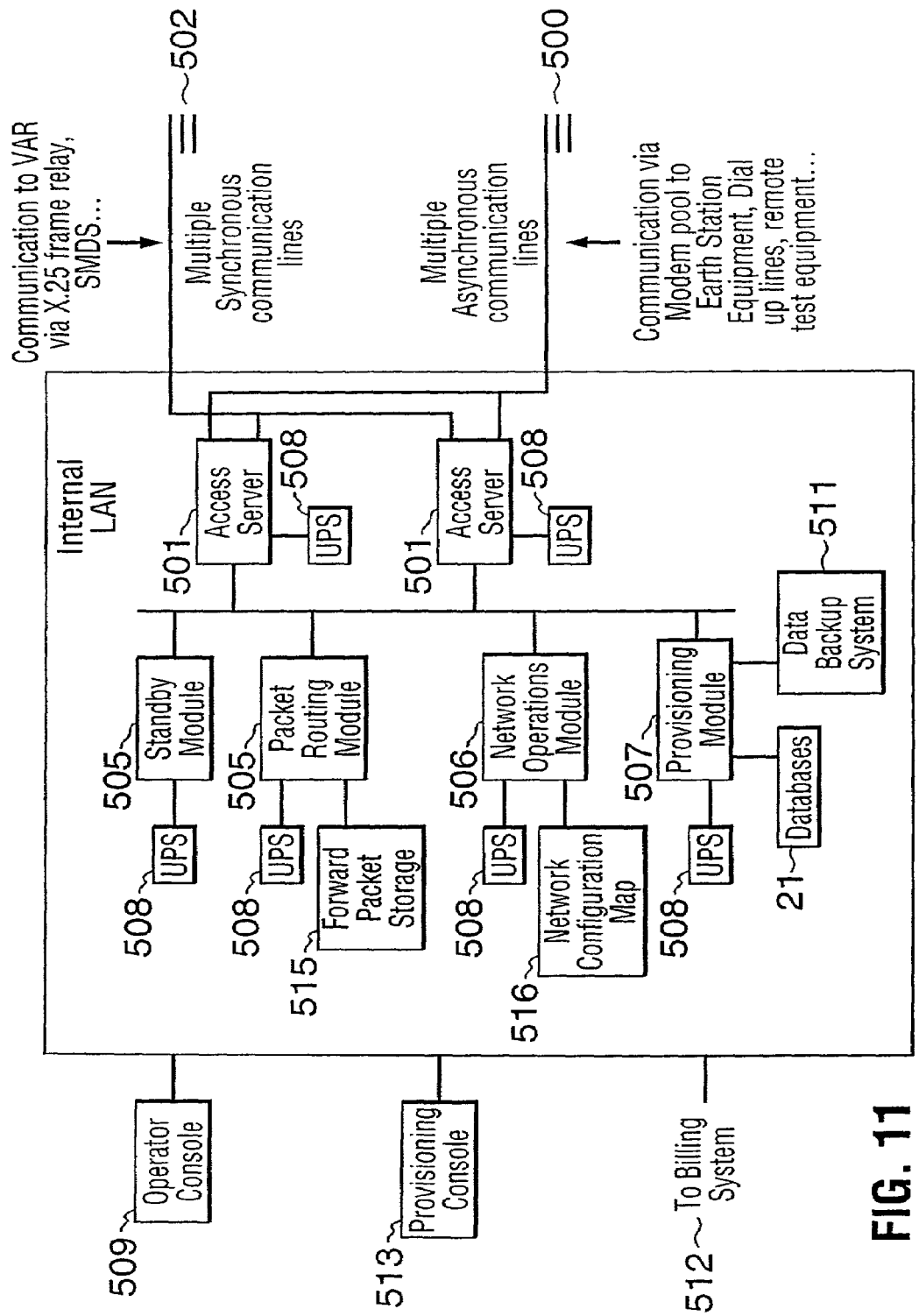
FIG. 11 is a block diagram of a packet processing center.

The Packet Processing and Network Operations Center (commonly abbreviated to PPC) 13, which is shown in more detail in FIG. 11 is an integral part of the Data Gathering System (DGS). The PPC 13 provides the communication and processing hub between VARs (Value Added Resellers) and remote terminals via the Earth Station Equipment 11.

The PPC 13 is of modular design to facilitate evolution, upgrades, customizing, and scalability. Its customizable access servers 501 allow for a variety of communications modes (Synchronous, asynchronous), interfaces, protocols, remote access, and message routing. It has high reliability and availability via duplication, database replication and backup, standby operation, and uninterruptible power supplies (UPS) 508. It uses an internal high speed LAN to avoid message traffic congestion. It employs software downloadable workstations and customized software to tailor to specific application, and to allow for future enhancements and evolution.

The PPC provides the following functions:
packet processing (recognition, encoding, decoding, formatting, and interpretation)
Messaging interface to VAR to enable control and monitor of remote terminals.
Packet scheduling to align with terminal wake up frequency and time slot assignment.
Packet traffic load distribution.
Packet and message routing
Security (authentication, authorization, and accounting).
Packet and usage accounting (for billing purposes).
Database management system for provisioned data. this includes
  VAR information
  Terminal parameters
  Terminal group information
Communication links parameters
Database backup facility and interface to off-site storage medium (tape).
Operator interface for network monitor and control.
Operator interface for provisioning access to databases.

The packet routing module 505 provides the packet and message processing functions. Packets received from remote terminals are routed via the access servers 501 to this module, where they are decoded, interpreted, logged and accounted. If a message is required to be sent on to the appropriate VAR 14 as a result of receiving a packet, this message is compiled and formatted in this module. VAR messages are then sent on to their appropriate destination via the access servers 501 and communications lines 502.

In the forward direction, packets destined to terminals are compiled and formatted by this module 505. This module also provides the packet scheduling function to ensure packets are sent on to align with terminal wake-up times.

The Packet Routing Module 505 also maintains a store of the packets in the forward package storage unit 515 to be sent to terminals. These packets are sent at the appropriate time to align with terminal wake-up times.

The access servers 501 control communication to and from PPC 13. Access servers also handle the lower layer protocols and physical interfaces required for the various communications links.

The access servers 501 also provide security services for the PPC 13. Security services are authentication, authorization, and accounting.

The access servers 501 are duplicated for reliability. These modules are expandable for growth, and customizable to tailor to specific applications and interfaces.

The network operations module 506 provides the main interface to the system operator 509. The system's health status and operational state is maintained by this module. An interface is also provided by this module to enable the operator 509 to perform maintenance and testing operations on the system. The network management, network configuration, and trouble ticketing are also handled here.

The provisioning module 507 handles database management for the PPC 13. This is the main store for all provisioned and billing information. The databases maintained by the provisioning module 507 contain information on VARs and terminals, their characteristics, and how and when to communicate with them. The terminals database maintains a current list of the terminals active periods and can therefore ensure that communications with the terminals are provided at the appropriate time.

Any interface required to a downstream billing system is provided by this module.

The ability to backup and restore provisioned information is provided by back-up unit 511. Back up is to a hard medium (DAT tape) for offsite storage.

The standby module 505 is provided for reliability purposes. This module becomes active in the event of failures. A database replication is updated regularly.

The asynchronous communication lines 500 are provided for communication with external units, such as the Earth station 11.

Uninterruptible power supplies 508 are provided where necessary to guard against short term power outages.

The PPC 13 will normally be geographically separated from the earth station and connected to it through the access servers 501 via modem pools. The access servers 501 are also connected to VARs via X.25, frame relay or SMDS networks.

As an illustration of the operation of the invention, Consider an example where a trucking company has a large fleet of trucks, among which are ten refrigeration trucks operating in the "central" satellite beam. Up until the present moment, the company has been satisfied with monitoring the temperature of the refrigeration units once every four hours; however a heat wave has occurred, and the company now wants to keep track of the temperature hourly.

It is assumed that each of the ten truck terminals has previously been programmed to wake up at the same, specific subframes separated by four hours to look for messages with the group address for the company's refrigeration trucks. When they wake up, the terminals are programmed to read in the analog voltage corresponding to the refrigerator unit temperature, convert it to a digital word, and store it in the form of a return message.

The trucking company, an end customer 15, will communicate via (say) dial-up land line with the Value Added Retailer (VAR) 14, requesting that a specific group of their terminals should have their wake-up schedule modified from once each four hours to once each hour, and that they should be polled to respond each wake-up time with the voltage measured on their analog input. The VAR has no need to know which trucks are being polled, or what information is being returned. The VAR 14 then passes this information to the Packet Processing Center 13 using communications lines 502.

The message from the VAR is accepted by the Access Server 501 and passed to the Provisioning module 507. The Provisioning module will verify that the VAR request is valid, place the reschedule information in its Database 21, and pass the message to the Packet Routing module 505. The Packet Routing module will take the request for more frequent terminal wake-up and convert that to a new schedule of terminal wake-up times for the specified group of terminals. It will then compose a message to the terminal group with the new wake-up schedule, time stamped for transmission at the old, four hour wake-up time, and place the message in the Forward Packet Storage 515. At an appropriate time, the Packet Routing module 505 will generate a poll message for the specified terminals. The Packet Routing module 505 will store this message in the Forward Packet Storage 515, in the same forward subframe 123 as the previous message.

A few seconds before the identified subframe 123 is to be transmitted, the contents of the subframe, including the two message packets 125, will be retrieved from the Forward Packet Storeage 515, and through the Access Server 501, placed on the line 500 providing communications to the Earth Station 11. The address field of the two message packets 125 for the specified trucks will contain the group address of the ten trucks. The subframe will be received at the Earth Station 11 by the Modem 400. It will be read and stored, along with a word which specifies the frequency of transmission, by the Data Converter 401 and the Frame buffer 402. When the time for transmission of the subframe 123 arrives in the hierarchical frame structure 120, 121, 122, the subframe 123 is read out of the Frame Buffer 402, is error coded in the FEC 403, is interleaved and windowed in the Window 404, is converted to an analog signal in the D/A 405 and used to BPSK modulate a carrier in the Modulator 406. The carrier frequency, based on the word which had been stored along with the subframe 123 in the Frame Buffer 402, is generated by the Synthesizer 408. The output of the Modulator 406 is filtered and passed to the Earth Station RF Equipment (RFE) 407 where it is upconverted and transmitted 17 to the satellite 18. The satellite 18 translates the received frequency, and by virtue of in which of the several uplink frequency bands it has been transmitted 17(2) (e.g.), downlink transmits the signal in one of the satellite beams 19(2) where it is received by the terminals 20 of that beam.

The identified terminals 20 were programmed to wake just before the time the identified subframe 123 is due to arrive. The terminals 20 will receive the downlink signal 19(2) on their antenna 300, amplify it in the Low Noise Amplifier 301 and downconvert it to a first IF frequency 304, a second IF frequency 305 and finally to quadrature baseband in mixers 307 and 316. The quadrature baseband signals are sampled and held in the S/H 308 and 317, and passed to the microcontroller 310, where they are A/D converted 201, 60. The two series of digital samples are frequency corrected 218 using the algorithm of FIG. 9, and the terminal Reference Oscillator 216, 319, 64 is corrected using this algorithm. The corrected digital samples are demodulated 61, decoded 62 and stored for interpretation 77. One action is to follow the algorithm of FIG. 8 to correct the terminal timing. A second action for each terminal 20 is to look for its address in any of the ten data packets 125 in the subframe 123.

Figure 5B:
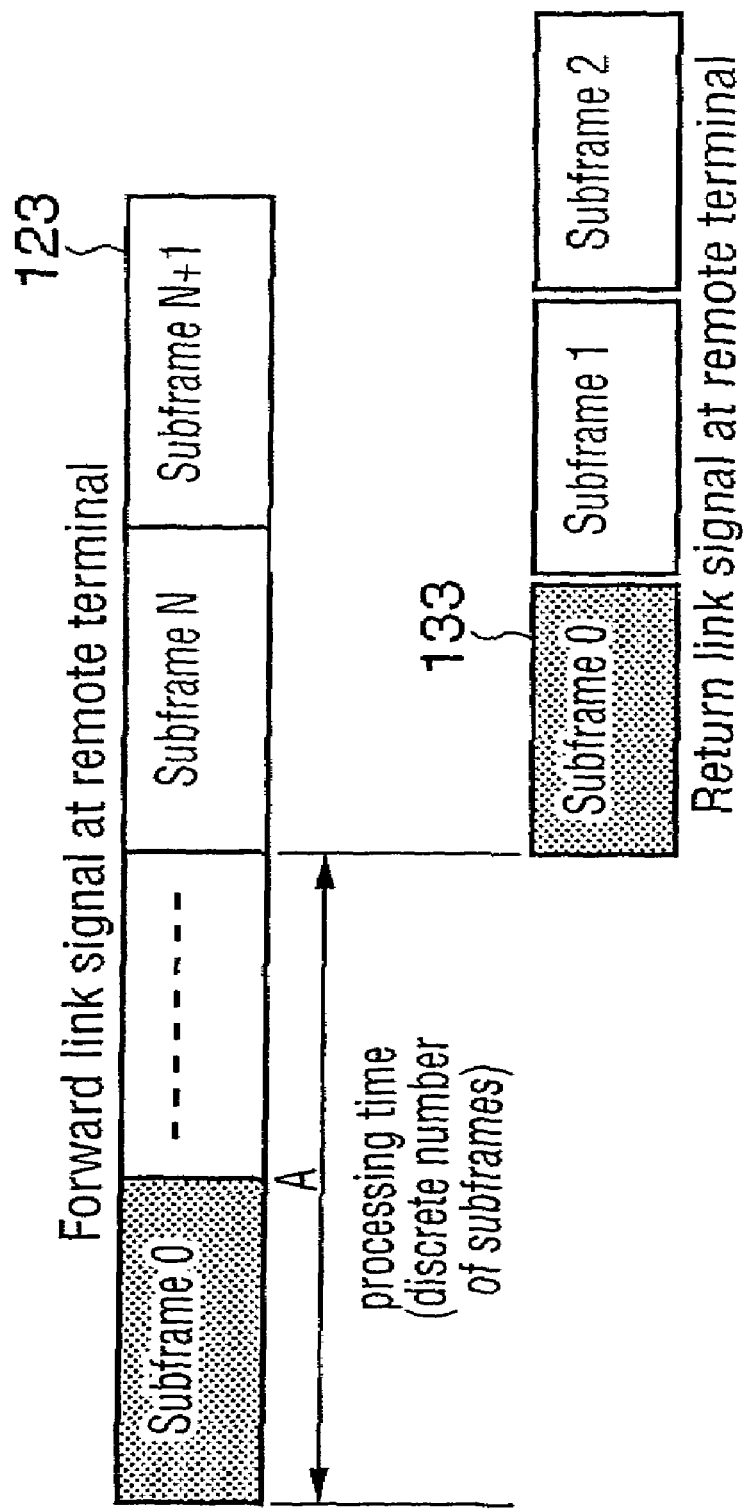
FIG. 5b is a diagram showing the timing synchronization of the forward and return link frame structures.

Assuming each of the ten identified terminals 20 has successfully demodulated and decoded the subframe 123, it will recognize that two of the data packets 125 contain its address. It will read the data packet 125 related to wake-up time and change its stored wake-up schedule. It will read the data packet 125 which contained a poll message, and will recognize that it is required to respond with a return message containing the latest reading of its analog input port 67. The return message will be formatted in the Data Formatter 69 and held for the appropriate return subframe 133, part of the return hierarchy 130, 131, 132, and time delayed from the identified forward subframe 123 by an integral number of subframe periods, as shown in FIG. 5b, where the identified subframe 123 is called forward subframe 0, and the associated return subframe 133 is called return subframe 0. When the appropriate return subframe 133 arrives, the return data packet, which fills the return subframe 133, will be read from the Data Formatter 69, coded and interleaved in the Channel Encoder 70, spectrum spread in the PN Encoder 71, and fed to the QPSK modulator 74, 321, which will modulate the carrier from the Synthesizer 55, 320. The modulated carrier will be amplified 322 and 323 and passed to the terminal Transmit Antenna 324 for transmission 19(2) to the satellite 18. The satellite 18, translates the uplink signal frequency from L-band to Ku-band and transmits the signal down 16(2) to the Earth Station 11.

For this example, it will be assumed that all ten terminals transmitted their return message in the same return subframe 133 using Code Division Multiple Access. The received composite signal is downconverted in the Earth Station RF Equipment 407, again in mixer 410, and finally downconverted to quadrature baseband in mixers 412 and 414. The analog I and Q channels are digitized 415 and 416 and passed to the Processor 421 where Demodulation 417, Deinterleaving 418, Decoding 419 and CRC coding is verified 420, with parallel processing of all of the ten return packets. The ten return messages will then be passed to the Data Converter 401, which will format them for transmission through the Modem 400 over the landline 12, 500 to the Packet Processing Center 13.

In the Packet Processing Center 13, the Access Server 501 will receive the ten messages and send them to the Packet Routing module 505. The Packet Routing module 505 will determine the VAR 14 to which the ten messages are destined and prepare the data for transmission to the VAR. The data will be sent through the Access Server 501 along the landline 502 to the VAR 14. The VAR will identify the Customer 15 for whom the data is intended and forward the data.

Aside for a possible wait for the arrival of the next wake period of the terminals, this process will be completed in less than 20 seconds, and the trucking company will have the first of its hourly temperature reports.

As will be appreciated by those skilled in the art, the described network access scheme does not require periodic communications between the earth station and remote terminals and thereby allows a terminal to have an arbitrarily long inactive period. During this period the terminal needs only to completely wake up infrequently, say three times a day for a short period to listen to determine whether a signal is addressed to it during its assigned timeslot. This scheme results in an extended battery lifetime.

The described system also provides the ability to change terminal parameters over the air and to adjust the internal clock of the terminal. In addition, it permits the efficient use of available satellite bandwidth.

We claim:

1. A wireless packet data communications system, comprising:

a control station, and a plurality of widely dispersed, remote terminals having an active mode during which they are capable of at least one of transmitting and receiving data packets and a sleep mode during which they are inactive, said control station and each of said remote terminals being capable of engaging in packet data communication over a TDM forward link from said control station to said terminals and a multiple access return link from said terminals to said control station, each said remote terminal having an address and being assigned specific times on the forward link during which it may be addressed by said control station, and each said terminal including a timer operable in said sleep mode to cause said terminal to periodically enter the active mode during its assigned time and listen for incoming data packets from said control station addressed to said terminal, and a means for interpreting packets received over the forward link, and said control station including a storage device for storing information pertaining to the times assigned to the various remote terminals, means for transmitting data packets addressed to specific terminals at their assigned times on the forward link, and means for receiving data packets from the terminals in times on the return link.

2. The wireless packet data communications system of claim 1, wherein each terminal has a unique address.

3. The wireless packet data communications system of claim 2, wherein a subset of terminals is assigned to each time on the forward link, and each time carries a plurality of time division multiplexed data packets, each including an address field that may be individually addressed to any or all of the terminals assigned to that time.

4. The wireless packet data communications system of claim 1, wherein said control station comprises means for transmitting synchronization packets in at least some of said times of said forward link.

5. The wireless packet data communications system of claim 4, wherein the processor in each terminal is responsive during the active mode to packets transmitted on the forward link to resynchronize the terminal.

6. The wireless packet data communications system of claim 1, wherein said forward and return links employ a hierarchical frame structure and said times are subframes forming the lowest order frames therein.

7. The wireless packet data communications system of claim 1, wherein the times in said return link carry packets multiplexed using code division multiple access format.

8. The wireless packet data communications system of claim 1, wherein the time in said return link are offset by a predetermined time relative to the assigned times in the forward link.

9. The wireless packet data communications system of claim 8, wherein said predetermined time is an integral number of said times.

10. The wireless packet data communications system of claim 1, wherein the processor in each said terminal has a local interrupt for placing said terminal in the active mode so that it can transmit data in response to a local request to said control station over said return link using random access.

11. The wireless packet data communications system of claim 1, wherein, in addition to said active mode, each said terminal has a semi-active mode during which said processor is active just long enough to extract synchronization words from incoming signals without extracting all the accompanying data.

12. The wireless packet data communications system of claim 11, wherein said processor forms part of a microcontroller controlling the operation of the terminal.

13. The wireless packet data communications system of claim 12, where said timer periodically wakes up said microcontroller more frequently than said terminal is programmed to enter the active or semi-active mode, and said microcontroller determines whether it is time to place said terminal into the active or semi-active mode in accordance with a program stored in the terminal.

14. The wireless packet data communications system of claim 13, wherein said microcontroller is responsive to commands received over said forward link to change the times when it is in the active mode.

15. The wireless packet data communications system of claim 13, wherein said wake-up mode occurs several times per second.

16. The wireless packet data communications system of claim 1, wherein said forward and return links travel via satellite, and said control station includes an earth station for communicating with said satellite.

17. The wireless packet data communications system of claim 16, wherein said control station also includes a packet processing center for formatting data sent to, and deformatting data received from, the satellite.

18. The wireless packet data communications system of claim 17, wherein said storage device is located at said packet processing center.

19. The wireless packet data communications system of claim 16, wherein said satellite is a multi-beam satellite, and said control station stores data pertaining to the beam in which each terminal is located, whereby said transmitting means sends data to a terminal in its assigned time and on the beam in which it is located.

20. A remote terminal for use in a wireless packet data communications system comprising a control station and a plurality of widely dispersed, remote terminals having an active mode during which they are capable of at least one of transmitting and receiving data packets and a sleep mode during they are inactive, said control station and each of said remote terminals being capable of engaging in packet data communication over a forward TDM link between said control station and said terminals and a multiple access return link between said terminals and said control station, each said remote terminal having an address and being assigned a time during which it may be addressed by said control station, said remote terminal comprising an electronics unit for transmitting and receiving signals to and from said control station over said respective return and forward links, and a timer operable in said sleep mode period to cause said terminal to periodically enter the active mode during said assigned time to listen for incoming data packets from the control station addressed to said terminal.

21. The remote terminal of claim 20, further comprising a processor for interpreting data received during said assigned time and formatting outgoing data for transmission over said return link.

22. The remote terminal of claim 20, further comprising means for resetting said timer in response to packets received over said forward link.

23. The remote terminal of claim 20, further comprising a local oscillator for generating the necessary frequencies within the terminal to transmit and receive packets over said return and forward links, said local oscillator being resynchronized in response to synchronization packets.

24. The remote terminal of claim 20, wherein said processor prepares outgoing packets for transmission in CDMA format on the return link.

25. The remote terminal of claim 20, wherein said processor includes means for placing said terminal in the active mode in response to a local request to transmit data to the control station using random access on the return link.

26. The remote terminal of claim 25, wherein said processor includes a stored program for controlling the operation of said terminal to minimize network traffic by delaying outgoing packets in the event of network congestion.

27. The remote terminal of claim 20, further comprising an antenna unit that includes an L-band microstrip antenna capable of receiving signals at least at 1575.42 MHz and in the range 1525 to 1559 MHz.

28. The remote terminal of claim 20, further comprising a GPS unit connected to said antenna unit to generate data indicative of the location of the terminal for transmission back to the control station over the return link.

29. The remote terminal of claim 20, wherein said processor is responsive to commands received from the control station over the forward link to change the time in which the terminal is placed in the active mode.

30. The remote terminal of claim 20, which has a semi-active mode in addition to said active mode, said processor being active in said semi-active mode just long enough to extract synchronization packets from the incoming signals on the forward link and resynchronize said terminal.

31. The remote terminal of claim 20, wherein said processor is a microcontroller, and said timer wakes up said microcontroller more frequently than said terminal enters the active or semi-active mode in order to for said microcontroller to determine whether it is time to enter the active or semi-active mode.

32. A control station for a wireless packet data communications system comprising said control station and a plurality of widely dispersed, remote terminals having an active mode during which they are capable of at least one of transmitting and receiving data packets and a sleep mode during which they are inactive, said control station and each of said remote terminals being capable of engaging in packet data communication over a TDM forward link between said control station and said terminals and a multiple access return link between said terminals and said control station, said forward and return links being established via satellite, each said remote terminal having an address and being assigned times during which it wakes up to listen for a data packet from said control station, said control station comprising a database for storing the times assigned to the various remote terminals, means for transmitting data packets addressed to specific terminals in their assigned times in TDM format, means for interpreting data packets received in the times on the multiple access return link, and a packet processing center for formatting packets for transmission on the forward TDM link to remote terminals in their assigned times and deformatting packets received on the multiple access return link, said database being located in said packet processing center.

33. The control station of claim 32 further comprising a CDMA processor for receiving data packets in CDMA format from terminals in times on the return link.

34. The control station of claim 32 wherein said packet processing center comprises means for generating data packets to instruct an addressed terminal to change a parameter, such as its assigned times.

35. A wireless packet data communications system, comprising a control station and a plurality of widely dispersed, remote terminals, means for establishing a forward TDM link from said control station to said terminals, and means for establishing a multiple access return link from said terminals to said control station to permit selective packet data communication between said control station and any of said terminals, groups of said terminals being assigned specific times during which they may be addressed by said control station, and said control station assigning said times so as to spread the active periods throughout the day, and means for controlling a delay between the time of reception of a command by a terminal and the time when it transmits its response back to the control station, said data packets transmitted over said forward link having an overflow flag to indicate that additional data is being transmitted in a subsequent time, and said control station further comprising means for spreading the messages addressed to the terminals over two or more subframes and setting said overflow flag to advise said terminals that messages for them may be spread over several subframes in order to relieve congestion in the system.

36. The wireless packet data communications system of claim 35, wherein the times in said multiple access return link carry packets multiplexed using code division multiple access format.

37. The wireless packet data communications system of claim 35, comprising means for imposing return priority or by allocating more return subframes to specific terminals on the multiple access return link to relieve congestion in the return link.

38. A method of establishing communication in a wireless packet data communications system comprising a control station and a plurality of widely dispersed, remote terminals having an active mode during which they are capable of at least one of transmitting and receiving data packets and a sleep mode during which they are inactive, said control station and each of said remote terminals being capable of engaging in packet data communication over a TDM forward link from said control station to said terminals and a multiple access return link from said terminals to said control station, said forward and return links being via satellite, and each said remote terminal having an address and being assigned specific times on the forward link during which it may be addressed by said control station, said method comprising the steps of:
 periodically waking up said terminals in their assigned times to listen for incoming data packets addressed thereto from the control station;
 extracting information pertaining to the times assigned to the various remote terminals from a database at the control station;
 transmitting data packets addressed to specific terminals in their assigned times on the forward link; and
 receiving data packets from the terminals in times on the return link.

39. The method of claim 38, wherein said terminals also have a semi-active mode in which they are woken up long enough to extract synchronization data from incoming signals.

40. The method of claim 39, wherein CDMA is employed on the return link.

* * * * *